US010233897B2

(12) United States Patent
Stenzel

(10) Patent No.: US 10,233,897 B2
(45) Date of Patent: Mar. 19, 2019

(54) POTENTIAL ENERGY STORE WITH SEAL

(71) Applicant: HEINDL ENERGY GMBH, Stuttgart (DE)

(72) Inventor: Gerd Stenzel, Trossingen (DE)

(73) Assignee: HEINDL ENERGY GMBH, Stuttgart (DE)

(*) Notice: Subject to any disclaimer, the term of this patent is extended or adjusted under 35 U.S.C. 154(b) by 210 days.

(21) Appl. No.: 15/120,785

(22) PCT Filed: Feb. 24, 2015

(86) PCT No.: PCT/EP2015/053788
§ 371 (c)(1),
(2) Date: Aug. 23, 2016

(87) PCT Pub. No.: WO2015/128309
PCT Pub. Date: Sep. 3, 2015

(65) Prior Publication Data
US 2016/0363111 A1 Dec. 15, 2016

(30) Foreign Application Priority Data

Feb. 25, 2014 (DE) .................... 10 2014 102 405

(51) Int. Cl.
F15B 1/00 (2006.01)
F03B 17/02 (2006.01)
(Continued)

(52) U.S. Cl.
CPC ............ *F03B 17/025* (2013.01); *F03B 17/00* (2013.01); *F03G 3/00* (2013.01); *F03G 7/08* (2013.01);
(Continued)

(58) Field of Classification Search
CPC ........... Y02E 60/17; F16J 15/36; F15B 1/045; F15B 2201/312; F03B 13/06
(Continued)

(56) References Cited

U.S. PATENT DOCUMENTS 3,361,432 A 1/1968 Usher
4,524,982 A 6/1985 Hertz
(Continued)

FOREIGN PATENT DOCUMENTS

DE 910 238 B 4/1954
DE 35 14 750 A1 10/1986
(Continued)

Primary Examiner — Michael Leslie
(74) Attorney, Agent, or Firm — Muirhead and Saturnelli, LLC

(57) ABSTRACT

A potential energy store has a hydraulic cylinder in which a piston for storing energy in the form of potential energy of the piston is arranged. A position of the piston relative to the earth's surface can be varied. A pump pumps hydraulic fluid via lines into the hydraulic cylinder such that the piston is raised. A generator converts hydraulic energy of hydraulic fluid, which is displaced out of the hydraulic cylinder as the piston falls, into electricity. A seal arrangement is at least partially arranged between the hydraulic cylinder and the piston. The seal arrangement has a sealing section with a flexible support structure for absorbing the acting forces. The support structure may be coated on one or both sides with a layer which is impervious to fluid and which seals against the passage of fluid or may be impregnated with a solidified material which is impervious to fluid.

19 Claims, 20 Drawing Sheets

(51) Int. Cl.
    *F15B 1/04* (2006.01)
    *F03G 7/08* (2006.01)
    *F03B 17/00* (2006.01)
    *F16D 25/08* (2006.01)
    *F03G 3/00* (2006.01)

(52) U.S. Cl.
    CPC ............ *F15B 1/045* (2013.01); *F16D 25/083* (2013.01); *F05B 2240/57* (2013.01); *F05B 2260/42* (2013.01); *F15B 2201/312* (2013.01); *Y02E 10/20* (2013.01)

(58) Field of Classification Search
    USPC .......................................................... 92/77
    See application file for complete search history.

(56) References Cited

U.S. PATENT DOCUMENTS

| | | | |
|---|---|---|---|
| 9,869,291 B2 * | 1/2018 | Fiske | F03B 13/06 |
| 2013/0174725 A1 | 7/2013 | Heindl | |
| 2014/0042753 A1 * | 2/2014 | Bahner | F03B 13/06 |
| | | | 60/372 |

FOREIGN PATENT DOCUMENTS

| | | |
|---|---|---|
| DE | 196 34 852 A1 | 3/1998 |
| DE | 10 2007 057 323 A1 | 6/2009 |
| DE | 10 2007 062 672 A1 | 8/2009 |
| DE | 10 2008 006 897 A1 | 10/2009 |
| DE | 10 2010 034 757 A1 | 2/2012 |
| DE | 10 2010 034 757 B4 | 2/2013 |
| DE | 10 2012 210 845 A1 | 1/2014 |
| WO | WO 2013/114144 A1 | 8/2013 |

* cited by examiner

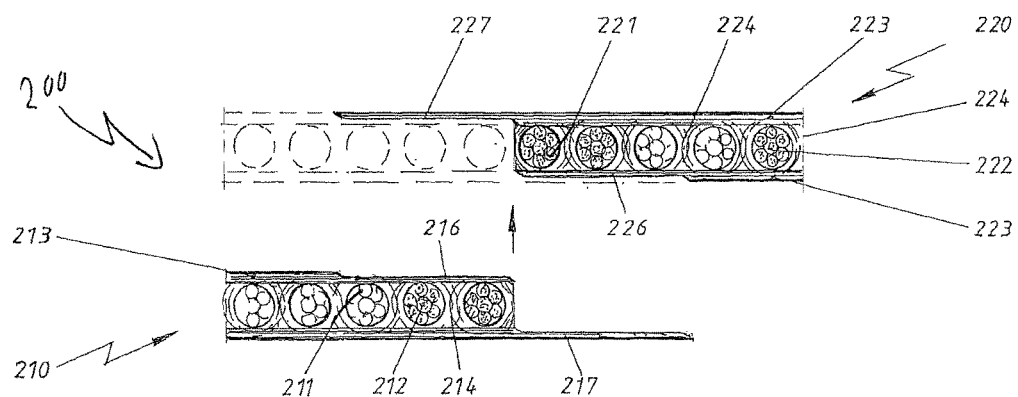
Fig. 2a
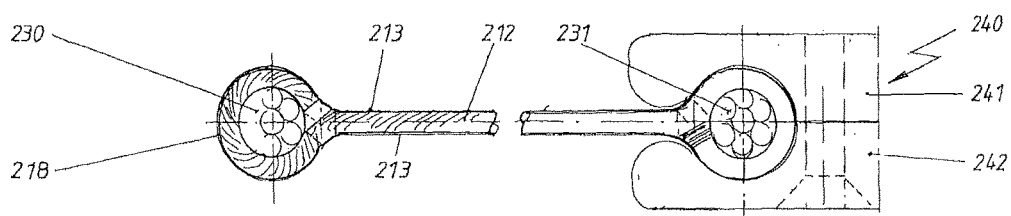
Fig. 2b
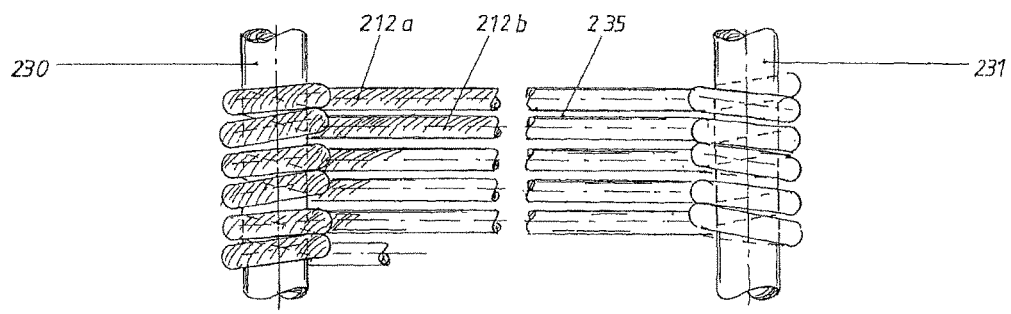
Fig. 2c
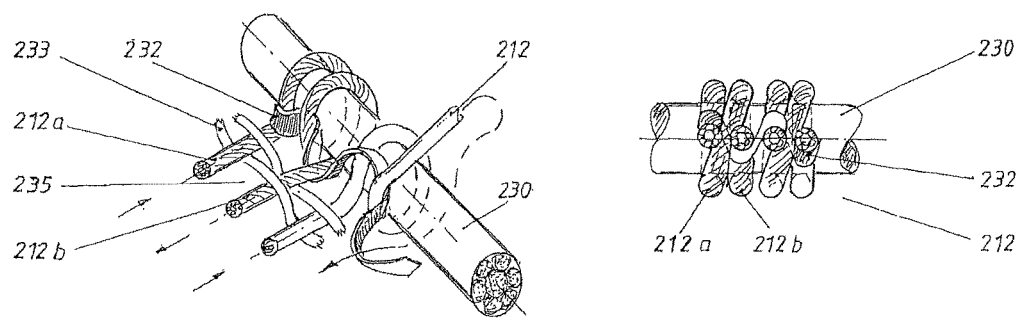
Fig. 2d
Fig. 2e

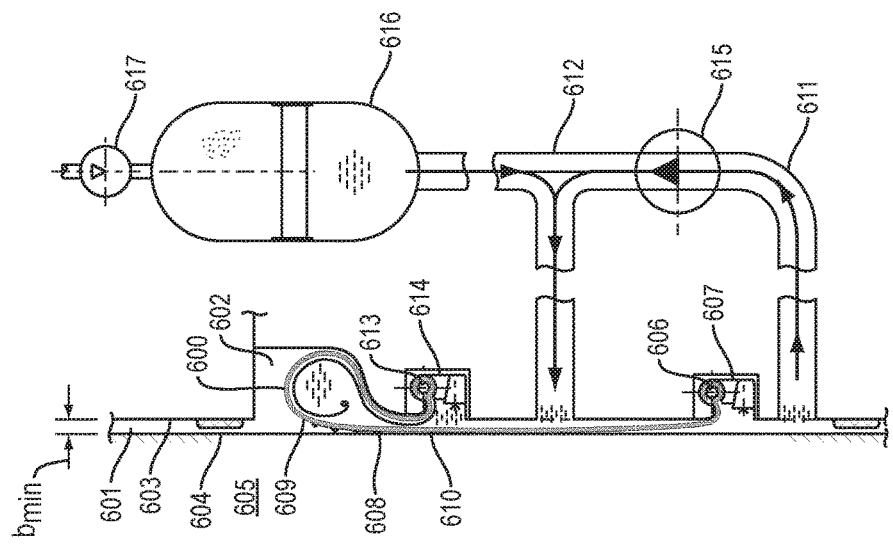
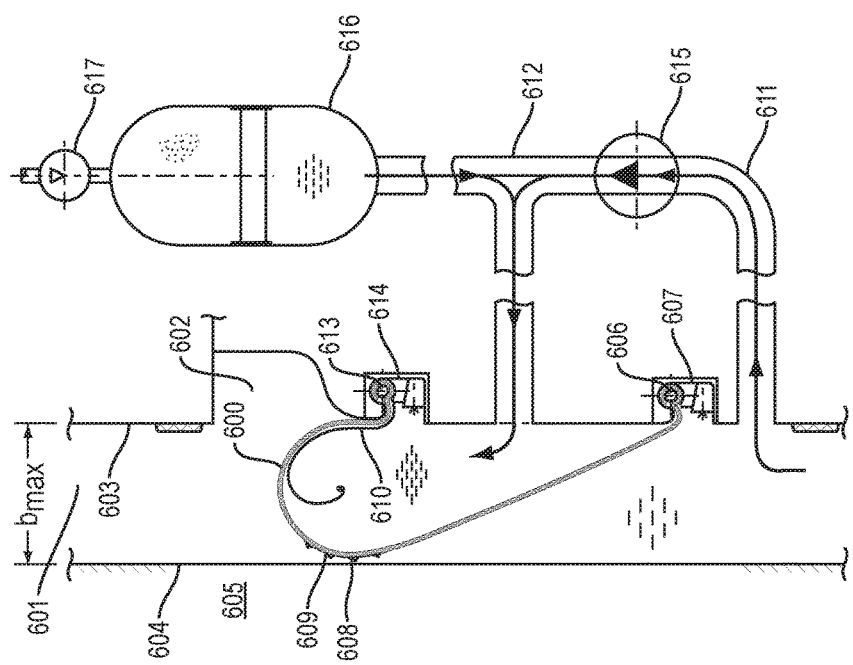

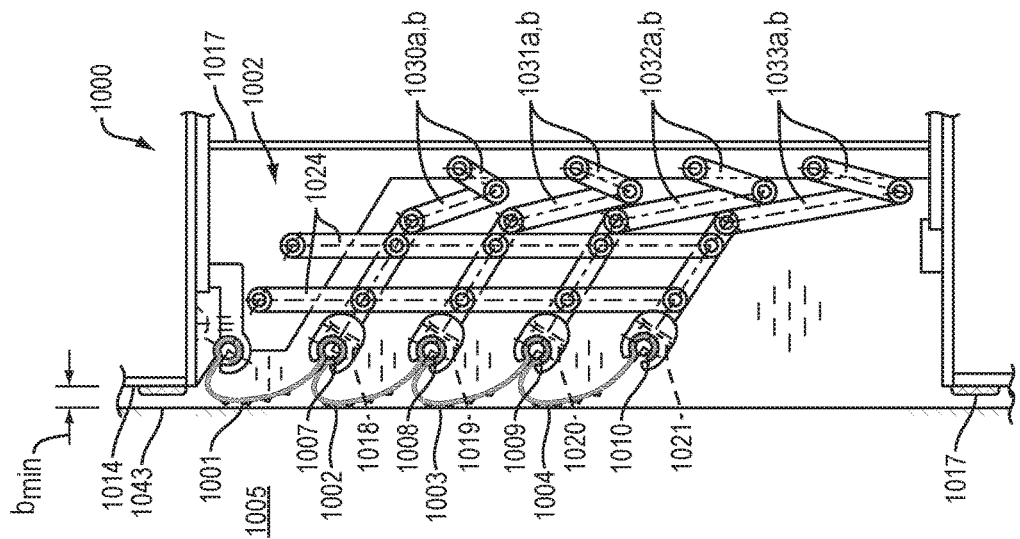
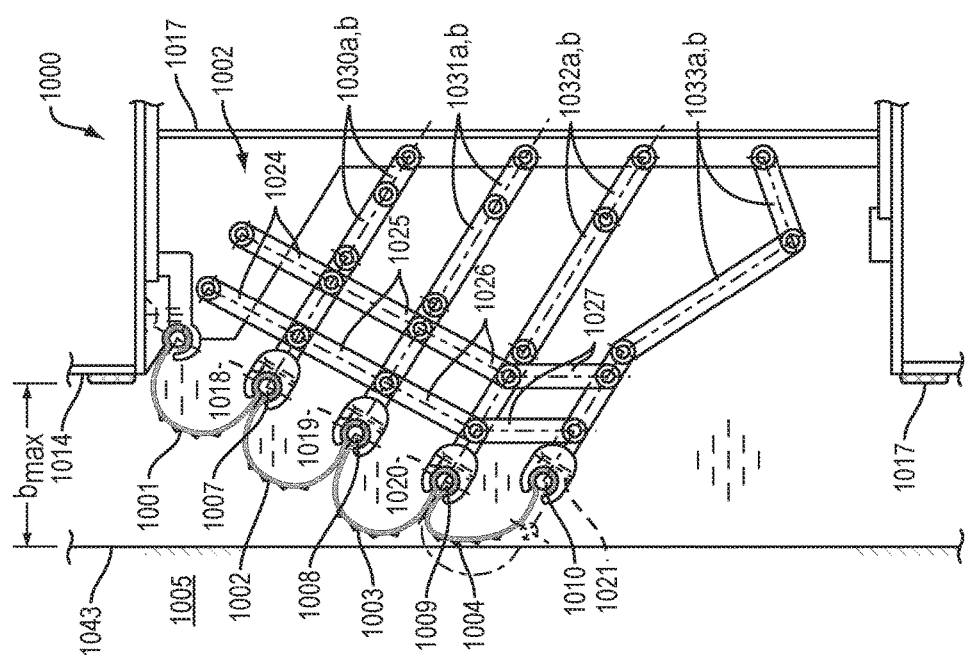

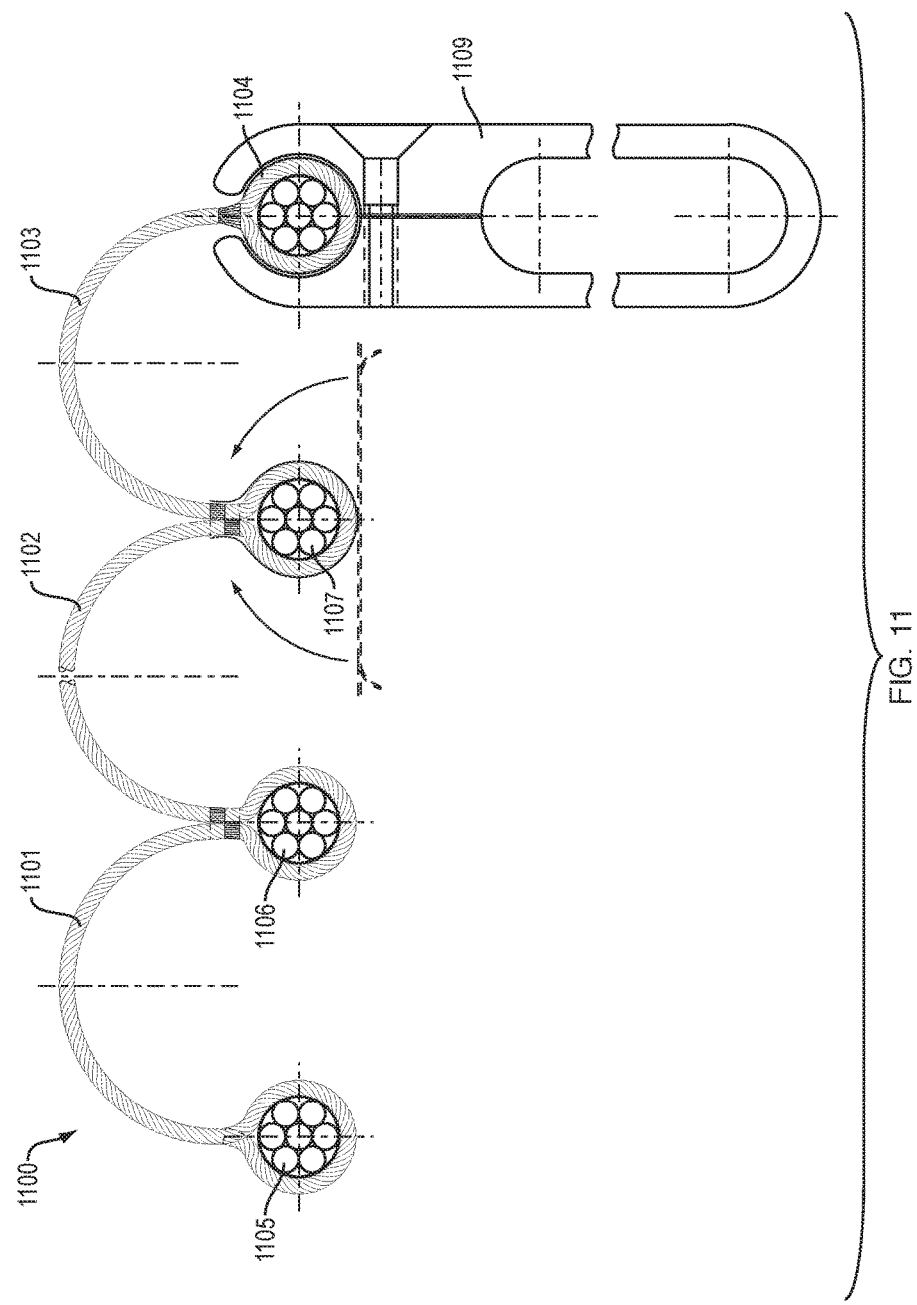

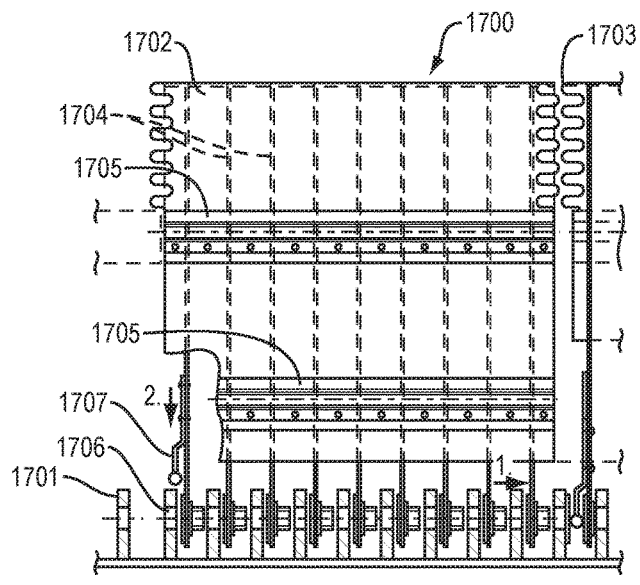
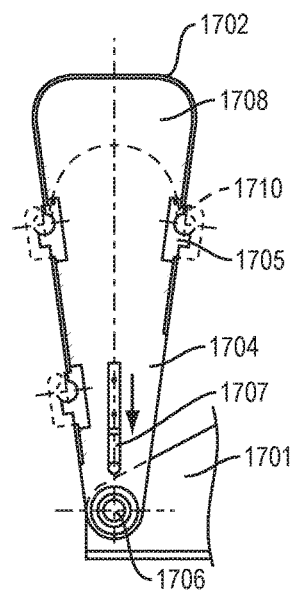
FIG. 17A  FIG. 17B
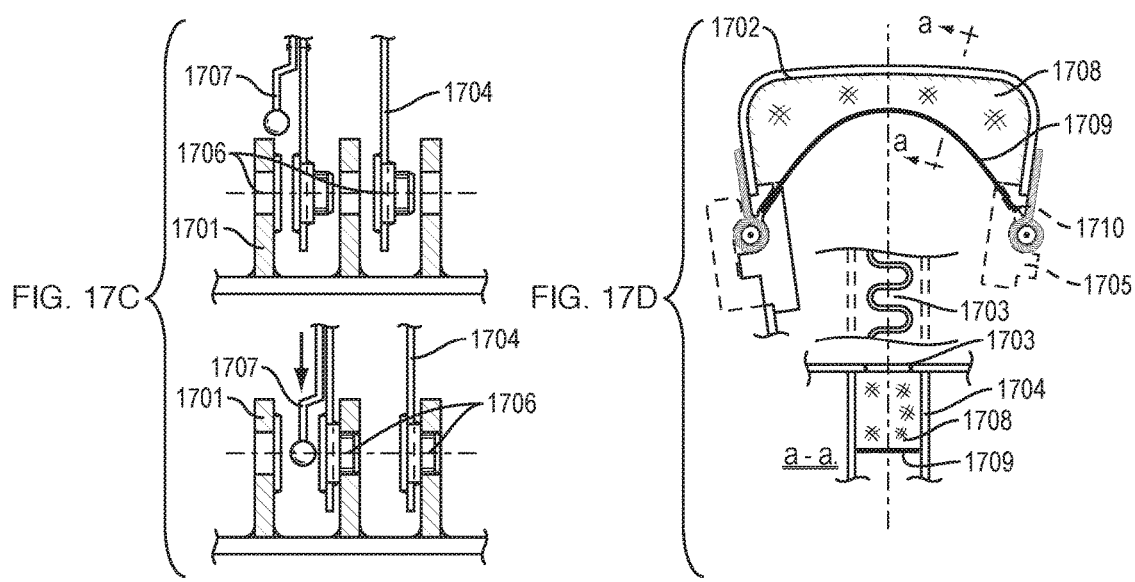
FIG. 17C  FIG. 17D

POTENTIAL ENERGY STORE WITH SEAL

TECHNICAL FIELD

This application relates to the field of storing energy and more particularly to the field of sealing liquid in connection with storing energy using hydraulic fluid to raise a large mass.

BACKGROUND OF THE INVENTION

The expansion of the utilization of renewable energies, which has accelerated in recent years, in particular the construction of numerous photovoltaic and wind power plants, the energy production of which is dependent on uncontrollable environmental conditions, has led to the realization that, in order to ensure a continuous supply of energy in accordance with demand, energy stores are of major significance. Accordingly, the development of energy stores, in particular energy stores which have a large storage capacity, have taken on great significance.

One category of such energy stores are positional energy stores, in the case of which excess energy is utilized for increasing the potential energy of a (large) mass. A category of positional energy stores that has been known for many years is that of pumped-storage power plants, in which water is pumped into a reservoir at a greater height in order to store potential energy. The capacity of individual pumped-storage power plants is however limited, and the number thereof cannot be increased arbitrarily owing to great requirements placed on the site.

Said disadvantages are avoided in the case of a new category of positional energy stores. In the case of said positional energy stores, an example of which is known from DE 10 2010 034 757 B4 and which will hereinafter be referred to as "generic positional energy stores", a large mass is raised relative to the earth's surface using a hydraulic fluid, for example water, in a hydraulic cylinder by virtue of the hydraulic fluid being pumped in via one or more lines, such that the mass practically constitutes the piston which is moved in the hydraulic cylinder, and energy is stored as potential energy of the raised piston.

When the piston has been raised as far as possible in the hydraulic cylinder, or when no excess energy is presently available for storage, the lines are closed off by way of valves or locks, and the piston remains in its present position.

The potential energy of the raised piston can then be converted into electricity again when the valves or locks are opened, without the pumps being operated. Then, hydraulic fluid is displaced out of the hydraulic cylinder, and the flow energy thereof can be converted into electrical energy again in a known manner by way of generators, similarly to the situation in conventional pumped-storage power plants.

Here, the mass may be formed in particular by a cut-out rock, and the required hydraulic cylinder may be formed by the stone surrounding the cut-out rock.

It is self-evidently necessary in the case of such positional energy stores for a seal to be arranged between the large mass, for example the rock mass, and the hydraulic cylinder, for example the surrounding stone, in order to prevent the uncontrolled escape of the hydraulic fluid, bypassing the line system.

The major advantage of said construction, in the case of which it is possible to realize piston diameters and lifting heights of several hundred meters, is the very high storage capacity of such installations, which greatly exceeds that of conventional storage power plants.

A positional energy store of the generic type described above is disclosed for example by DE 10 2010 034 757 B4.

Development work has shown that the provision of a well-suited seal ring is difficult, and the direct transfer of known sealing concepts leads to sub-optimal results.

It is a problem here that, in the case of high pressures to be managed, it is firstly the case that a relatively wide gap is present in relation to customary gap sizes to be sealed off, because the spacing between the working mass, which is formed by the piston, and the surrounding stone, which forms the wall of the hydraulic cylinder, has a typical minimum extent of several hundred millimeters up to 1000 mm.

Even if a relatively small extent of the spacing could possibly be technically realized in the uncharged state, this would not be desirable because, then, the rock mass, which forms the piston, is, in an at least partially deployed state, subject to a not inconsiderable wind pressure, which gives rise to slight tilting of the piston-forming mass relative to the hydraulic cylinder. In the case of an excessively small spacing between the mass and the hydraulic cylinder, jamming of the mass in the hydraulic cylinder could occur in said situation.

Specifically the tilting of the piston-forming mass in the hydraulic cylinder however intensifies the sealing problem yet further in that then, it is firstly the case that the width of the gap to be sealed off can vary along the lifting direction, and secondly, said width may also differ in different directions perpendicular to the lifting direction.

Furthermore, as a further peculiarity of the gap to be sealed off between piston and hydraulic cylinder, it is the case that the gap width varies in a manner dependent on the state of charge thereof, which correlates with the present lifting height of the piston. This can be attributed to the fact that the pressure of the hydraulic fluid that acts on the piston and hydraulic cylinder is dependent on said variable, and is of such a magnitude that the materials of which the components are composed are compressed. These effects lie in the range of decimeters in the case of positional energy stores with radii of a few hundred meters.

As a further problem, it is also the case that the surfaces of the piston and/or hydraulic cylinder do not define a perfect prismoidal body and are not sustained but are uneven and thus have a roughness not only on a microscopic scale. For example, mining work required for cutting a rock mass, which forms the piston of the hydraulic cylinder, out of the surrounding stone gives rise to structured stone surfaces. These rough surfaces increase demands on the seal in two respects. Firstly, the seal must be flexible enough that, when it comes into contact with a structured surface, it prevents the passage of fluid at every point of the surface structure. Secondly, however, it must be ensured that the seal is not subject to excessive wear in the event of a change in the position of the rock mass, which forms the piston of the lifting cylinder, in the lifting cylinder, such as is essential for the operation of the positional energy store.

It is therefore desirable to provide a positional energy store with an improved seal.

SUMMARY OF THE INVENTION

The system described herein includes a positional energy store having a hydraulic cylinder in which there is arranged a piston for the storage of energy in the form of potential energy of the piston, wherein the position of the piston relative to the earth's surface is variable, having a pump by way of which a hydraulic fluid can be pumped via lines into the hydraulic cylinder such that the piston is raised, and having a generator for converting flow energy of hydraulic fluid, which is displaced from the hydraulic cylinder during the lowering of the piston, into electricity, wherein a seal or seal arrangement is at least partially arranged between the hydraulic cylinder and the piston (that is to say in the region between the hydraulic cylinder and piston; an arrangement of the seal directly adjacent to both components is duly advantageous in numerous embodiments but is not intended to be implied by the wording "between hydraulic cylinder and piston"). Here, "at least partially arranged" means that the seal or seal arrangement does not need to be situated entirely in the gap, but may also have sections in the hydraulic cylinder, in the piston or in recesses provided in said piston.

The geometry of this—in many cases substantially cylindrically symmetrical—basic arrangement, and in particular the lifting axis thereof, also defines the expressions "outward", "inward", "upward" and "downward" for a positional energy store of said type. "Upward" corresponds to the direction in which the piston moves during the storage of energy in the positional energy store, and "downward" corresponds to the direction in which the piston moves during the extraction of energy from the positional energy store. "Outward" means radially away from the lifting axis, and "inward" means radially toward the lifting axis.

In the system described herein, the seal has at least one sealing section with a flexible carrier structure for accommodating the acting forces, which sealing section is coated on one or both sides with a fluid-impermeable layer for sealing against the passage of fluid, or is impregnated with a solidified fluid-impermeable material.

The restriction to "at least one sealing section" makes allowance here for the fact that, as discussed in detail below, seal arrangements are possible in which the seal is arranged in multi-layer form, in particular in effect in "folded" or "turn-over" form, in a gap between piston and hydraulic cylinder, and that, in the case of an arrangement of said type, for the sealing of the gap, it is sufficient for one of said layers, which all belong to one seal, to impart the sealing action, and that, as will likewise be discussed in detail below, seal arrangements are possible in which the sealing section and further components, of other construction, of the seal achieve the desired sealing action by way of the interaction thereof. Such a component may for example also be a part, which projects into the gap, of a concrete bearing ring for the seal, which bearing ring is anchored in the piston or in the hydraulic cylinder.

As is clear from the above section, this patent application thus makes a distinction between the expressions "sealing section", "seal" and "seal arrangement". Here, a seal is to be understood to mean the assembly, which may be composed of multiple components, which is arranged in the space to be sealed off. A necessary constituent part of a seal is at least one sealing section, that is to say at least one section or constituent part of the seal which can impart a sealing action, that is to say prevents the passage of hydraulic fluid through the space to be sealed off or a part thereof; a seal may however also have constituent parts which do not perform said function. The seal arrangement may comprise not only the seal but also components such as bearings or means for mechanical positioning, that is to say in particular means which define and/or influence the position of the seal in the space to be sealed off.

Particularly suitable materials for the fluid-impermeable layer are for example rubber, silicon, natural rubber or an elastic plastic. As a carrier structure, use may be made in particular of an arrangement of cables or bands. Such an arrangement may be formed for example by cables or bands arranged adjacent to one another with a spacing of a few millimeters or a few centimeters, and possibly also arranged as close together as possible, or by mutually adjacently arranged sections of such cables or bands. Where mutually adjacently arranged cables or bands are referred to below for the purposes of a concise and succinct wording, this is not intended to rule out a situation in which different sections of the same cable or of the same band are arranged adjacent to one another, but rather also encompasses said variant.

Explicit reference is made at this juncture to the fact that "mutually adjacent" does not necessarily mean "parallel to one another" or "directly adjacent", and in practice, it is advantageous for cables or bands to run at least with a profile component in a radial direction with respect to the axis of the lifting direction, which has the effect that the spacing of the cables or bands from one another is slightly smaller on that side of the seal which faces toward the piston than on the side facing toward the inner wall of the hydraulic cylinder. The practical relevance of this profile emerges from the fact that, overall, a circular-ring-shaped opening is to be sealed off. In the case of this seal geometry, it is the case in particular in this description that an end or edge of the seal refers to those sections of the seal by which the seal bears against, or is fastened to, the hydraulic cylinder or the piston.

For the sake of completeness, it is pointed out that the seal must self-evidently surround the piston in a radial direction, that is to say a section of the seal must be present in every direction as viewed perpendicularly with respect to the lifting axis. The expression "radially encircling seal" will be used below for this situation.

Here, it must be simultaneously possible for gaps of different widths in different directions, such as may arise for example as a consequence of a wind pressure offset of the piston, and gaps of different widths in the same direction at different points in time, such as arise from the fact that the pressure of the hydraulic fluid on piston and hydraulic cylinder varies in a manner dependent on the state of charge of the positional energy store and can lead to compression, which widens the gap, of piston and hydraulic cylinder, to be sealed off by way of the seal.

It is particularly advantageous if the sealing section or the seal is elastic, in particular reversibly expandable and reversibly compressible, in a circumferential direction of the piston, that is to say in each case locally in a direction tangentially with respect to the piston at the respective point. By way of said measure, an adaptation of the sealing section to variations, which are associated with different gap widths, of the circumference at the contact surface between sealing section or seal and piston or wall of the hydraulic cylinder can be realized.

For the manufacture, transport and installation of the seal, it is advantageous for the seal to be made up of individual segments, wherein, in particular, it is also possible for a seal assembled in the manner of a polyline to be realized in the case of large radii. In this case in particular, it may also be possible to use seals with cables or bands running parallel in order to form the individual segments. Although an arrangement in the manner of a polyline, for example on the hydraulic cylinder wall, gives rise, during a readjustment of the seal for sealing off a wider gap, to an overlap from a geometrical aspect between the sealing sections or seals of the individual segments, it is the case owing to the large radii of the positional energy store that said overlap can however be avoided by way of the preferred elasticity in the circumferential direction of the piston, in particular, in the example discussed, can be converted into a compression of the sealing section or of the seal.

In a particularly preferred embodiment of this invention, it is provided that, in the case of the installed seal, at least mutually adjacently arranged cables or bands of the carrier structure run in a direction which has a component radially with respect to the lifting direction and possibly a component parallel to the lifting direction, but no component tangentially with respect to the piston circumference. This implies that the seal is, on the one hand, anchored with both ends either on the hydraulic cylinder or on the piston or, on the hand, is anchored with one end on the hydraulic cylinder and with the other end on the piston, and yields the effect that the acting forces which are to be accommodated by the carrier structure are absorbed by the anchoring at said points.

For the above-described embodiment, it is particularly preferable if the mutually adjacently arranged cables or bands of the carrier structure are, at the ends of the seal, in each case fastened to a common bead cable or looped around the bead cable. The latter feature makes it possible in particular for mutually adjacently running cables or bands of the carrier structure to be formed by different sections of the same cable or band. The bead cable may then be used for the anchoring of the seal on the piston or on the inner wall of the hydraulic cylinder, for example by being received in an anchor box, which is fastened there, in particular cast in there and/or connected or clamped to steel reinforcements, by virtue of said bead cable being cast in using concrete.

Here, in this disclosure, a bead cable refers to a cable, in particular a steel cable, which has a diameter considerably larger, in particular at least twice as large, preferably at least three times as large, which in any case is equal to or exceeds the minimum cable eye size of the looped-around cable, wherein the cable may be formed for example by the interweaving or stranding of multiple cables or bands of the carrier structure.

On the one hand, by way of the bead cable with its considerably larger diameter, it is ensured that it can accommodate tensile forces of the cables or bands of the carrier structure arranged thereon. Secondly, the larger diameter ensures that cables or bands of the carrier structure can be wound around the bead cable without excessive kinking. Thirdly, a large diameter of the bead cable permits secure anchoring, for example in an anchor box.

Another exemplary embodiment for a carrier structure is a fabric composed of cables or bands.

For the use in positional energy stores, steel cables are particularly preferred as basic components of the carrier structure. For typical dimensions of positional energy stores and the resulting loads, it is for example the case that steel cables, in particular high-grade steel cables with a diameter of between approximately 5 mm and approximately 25 mm have proven to be particularly suitable.

Here, it is particularly preferable if the cables or bands of the carrier structure are connected to one another by way of a fabric such that the carrier structure is held together by the fabric. Spacer fabrics in particular are suitable for this purpose.

For example, steel cables as warp filaments and synthetic fiber fabrics as weft filaments may be woven together and then coated with the fluid-impermeable layer in order to realize a seal for a positional energy store.

To increase the service life of the seal, it is preferably possible for sealing lips or beads composed of rubber, silicon or an elastic plastic to be provided at positions of the seal at which an interaction with the piston or the inner wall of the hydraulic cylinder is to be expected.

Using a seal constructed in this way, it is possible to realize a series of different seal mechanisms which are optimized with regard to the different requirements of individual embodiments of positional energy stores. Here, the seal is intended to seal off in each case an area which is delimited by an inner circle (specifically the outer circumference of the piston) and by an outer circle (specifically the inner circumference of the wall of the hydraulic cylinder), wherein the inner circle can move in the outer circle (for example in the event of an offset of the hydraulic cylinder as a result of wind pressure), and which can furthermore change in a manner dependent on the state of charge of the positional energy store.

Rolling Diaphragm

A first sealing mechanism provides that, between the hydraulic cylinder and the piston, there is arranged a radially encircling sealing section which is formed by the entire seal and one end or one edge of which is anchored in a first bearing, which is recessed into the inner wall of the hydraulic cylinder, and the other end or the other edge of which is anchored in a second bearing, which is recessed into the outer wall of the piston. The bearings may for example be in the form of concrete rings on or in which the sealing section is recessed. The advantage of said sealing mechanism consists in that the seal does not have to be moved along a (rough) surface.

Here, it is particularly preferable if the spacing of the first bearing and of the second bearing when the positional energy store is fully discharged corresponds to half of the maximum lifting height, and, when the positional energy store is fully discharged, the second bearing, which is recessed into the outer wall of the piston, is arranged below the first bearing, which is recessed into the inner wall of the hydraulic cylinder. In this case, a sealing section with a length which exceeds half of the maximum lifting height by a few percent is sufficient for permitting the movement of the piston by the lifting height, which significantly reduces the cost outlay for the sealing section.

Canopy Seal

A second seal mechanism is based on a seal which surrounds the piston radially, that is to say perpendicular to the lifting direction thereof, and which thus forms a sealing sleeve. That section of the seal which is arranged in the gap to be sealed off forms a loop as viewed in a cross-sectional plane through the piston which encompasses the longitudinal axis thereof. Both ends or edges of the seal in the form of a sealing sleeve are anchored in two bearings recessed on or in the hydraulic cylinder or in two bearings recessed on or in the piston, such that a double-layer sealing sleeve is formed, wherein the non-mounted middle part, which forms the loop, points upward between the end sections and has a length which is greater than two times the maximum spacing between the piston and inner wall of the hydraulic cylinder by at least 200%, preferably 300%, and wherein the lower layer, which faces toward the hydraulic fluid, of the double-layer sealing sleeve is, in the loop-like section, at least partially permeable for the passage of hydraulic fluid, whereas the upper layer of the loop and the curved region of the loop, in which the upper layer transitions into the lower layer of the double-layer sealing sleeve, form the sealing section.

In the case of this seal arrangement, the double-wall sealing sleeve is thus formed, in other words, by virtue of the seal material being folded over and both ends or edges of the seal being anchored on or in the piston or hydraulic cylinder. Thus, as viewed in the cross section through the positional energy store, the sealing sleeve forms a loop which lies in the region between the piston and the hydraulic cylinder and which extends upward. The pressurized hydraulic fluid then enters the interior of the loop through those sections of the lower layer which are permeable to said hydraulic fluid, and said hydraulic fluid unfolds said loop and presses it against the wall in order to thereby effect the sealing action.

A major advantage of said seal arrangement lies in the fact that it compensates in a very straightforward manner for changes in the width of the gap to be sealed off. Here, by contrast to the above-discussed embodiment as a rolling diaphragm, the minimum space requirement is smaller, and it is possible to avoid very narrow bend radii on which the pressure acts, because, if necessary, a cutout can be provided in the piston even for example in the case of the mounting of the double-layer sealing sleeve on the piston.

In an advantageous refinement of said seal arrangement, it is provided that, in the interior of the double-wall sealing sleeve, there is arranged a bracing clamp or pressure-exerting spring which delimits the minimum radius of the loop in a downward direction and ensures the orientation of the loop in an upward direction. In this way, the fast unfolding of the loop can be ensured, and it is possible to prevent the loop from being pulled downward during the movement of the piston in the hydraulic cylinder.

Hose Seal

A variant of the above-described seal arrangement is obtained if a sealing sleeve is provided, which sealing sleeve surrounds the piston radially, that is to say perpendicular to the lifting direction thereof, the sealing section, which is arranged in the gap to be sealed off, of which sealing sleeve forms a loop as viewed in a cross-sectional plane through the piston which encompasses the longitudinal axis thereof, and in the case of which sealing sleeve both ends or edges of the sealing sleeve are anchored in two bearings recessed on or in the hydraulic cylinder or in two bearings recessed on or in the piston, such that a double-layer sealing sleeve is formed, wherein the non-mounted middle part, which forms the loop, points upward between the end sections and has a length which is greater than two times the maximum spacing between the piston and inner wall of the hydraulic cylinder by at least 200%, preferably 300%, but in the case of which sealing sleeve, by contrast to the embodiment discussed above, the pressurization which effects the sealing action is effected not by an introduction of fluid through a section of the loop which is permeable to the hydraulic fluid but in the case of which sealing sleeve the interior space of the loop can be subjected, by way of a feed of fluid through a pipe system, which is provided in the hydraulic cylinder or in the piston, to a pressure which at least corresponds to the pressure of the hydraulic fluid in the gap at the seal, but preferably exceeds said pressure by 5 to 10%, such that a positive pressure prevails in the interior of the loop.

As fluid, use may also be made of the hydraulic fluid itself, if said hydraulic fluid is conducted through a line system in the piston or in the hydraulic cylinder into the interior of the loop. It is however necessary, in particular if it is sought to utilize positive pressures, to also provide means for increasing pressure, for example by way of a pressurized-gas tank or a pump.

In the case of this variant, the behavior of the loop can be controlled even more effectively, and the seal function is ensured more reliably. This is the case in particular if positive pressure is utilized in the interior space of the hoses. However, it is necessary for a line system and possibly means for increasing pressure to additionally be provided.

Pressure Hose with Sealing Skirt

A further possibility for realizing the seal mechanism consists in providing a seal which is anchored on an upper bearing and on a lower bearing which are both arranged in the inner wall of the hydraulic cylinder or are both arranged in the piston, which seal, by way of at least one section, covers a pressure hose which is provided in an encircling recess of the inner wall of the hydraulic cylinder if the bearings are arranged therein or in a recess in the piston if the bearings are arranged therein and which runs radially around the piston and which can be subjected by way of a pump to a pressure which exceeds the pressure of the hydraulic fluid prevailing at the seal, such that the pressure hose expands into the gap between hydraulic cylinder and piston, and the seal is pressed in all directions perpendicular to the lifting direction into contact, at a contact point, with the inner surface of the hydraulic cylinder if the seal skirt is anchored on the piston or with the outer surface of the piston if the seal skirt is anchored on the hydraulic cylinder, wherein, in said position, the sealing section of the seal extends at least from the lower bearing to the contact point, such that no hydraulic fluid can escape.

The particular advantage of said seal system consists in that, through the provision of the pressure hose, the seal or the sealing section is pressed even into local depressions and thus permits the reliable sealing even of structured surfaces in a straightforward manner.

Here, it is advantageous in particular for the anchoring of the seal in the upper bearing to be configured so as to be movable such that said anchoring at least partially compensates the change in the travel length from the lower bearing via the hose surface to the upper bearing, such as is normally associated with the expansion of the pressure hose. This can be achieved in particular by virtue of the sealing skirt being anchored in the upper bearing by way of tension springs.

Stepped Canopy Seal (Bellows)

A disadvantage of the seal arrangements discussed up to this point can be seen in the fact that, in each case, a relatively expanded, flexible seal is arranged in the region of the gap, which has the effect that the movement of said seal during the movement of the piston relative to the hydraulic cylinder, such as is associated with the operation of the positional energy store, can be difficult to control.

Said problem can be reduced by virtue of multiple relatively small and thus more easily controllable seals or sealing sections being provided which are connected to one another so as to form a seal bellows, which seals or sealing sections are guided mechanically. Here, the mechanical guidance may act in particular at the connecting points, for example by way of a clamp which engages over the connecting point, or eyelets or lugs which are jointly integrated into the connecting point. Here, the mechanical guidance may be ensured for example by way of pull rods with end delimitation or holding system mechanisms or scissor-mechanism anchors. The systems constructed in this way can also be folded up, without drive action, by hydraulic fluid introduced into the space between the seal and the bearing arrangement thereof, though a mechanical or hydraulic drive is also conceivable.

A side effect of these arrangements consists in that the considerably smaller resulting sealing sections are considerably reduced at least with regard to the costs associated with their production.

Folding Canopy Seal

In a further alternative embodiment of the seal arrangement, it is provided that the sealing section is mounted by way of at least one edge, preferably its upper edge, on a rigid seal carrier which is however mounted in rotatable or displaceable fashion in the piston or, preferably, in the inner wall of the hydraulic cylinder, which seal carrier can, by way of the rotation or the displacement, be moved into the gap between the inner wall of the hydraulic cylinder and the piston, such that the seal carrier which is moved into the gap, or an attachment part fastened to said seal carrier, blocks the flow of hydraulic fluid through that part of the gap which is covered by the seal carrier or by the attachment part fastened thereto, wherein the sealing section seals off that part of the gap which remains between the seal carrier and the inner wall of the hydraulic cylinder if the seal carrier is mounted in the piston, or between the seal carrier and the piston if the seal carrier is mounted in the inner wall of the hydraulic cylinder. Said arrangement has the advantage that the extent of the sealing section can be kept small.

An advantageous refinement of said seal arrangement provides that the seal carrier is of circular segment-shaped form and is mounted rotatably on pressure rollers such that said seal carrier is guided on a circular path, the central point of which lies in the gap to be sealed off. In this way, bending moments which act on the seal carrier can be reduced and managed.

An additional or alternative refinement provides that a further sealing section which is in the form of a rolling diaphragm is arranged between the seal carrier and the bearing thereof, such that the pressure of the hydraulic fluid on the further sealing section causes the sealing section to be pressed on. In this way, it can be ensured that the sealing section always imparts a good sealing action.

For all of the seal arrangements discussed above, which are mounted only on one side of the gap, that is to say either on the hydraulic cylinder or only on the piston, it is advantageous if, in the inner wall of the hydraulic cylinder, if the seal is arranged on the hydraulic cylinder, or in the outer wall of the piston, if the seal is arranged on the piston, there is provided a recess in which the seal can be received if the width of the gap between the hydraulic cylinder and the piston decreases. Such a decrease of the gap width may occur in particular in the presence of high wind pressure, which reduction may also take place to such an extent as to give rise to intense loading of the seal if the latter cannot deflect. Through the provision of a receptacle for the seal, said load can be avoided in an effective manner. A minimum spacing between inner wall of the hydraulic cylinder and outer wall of the piston can be ensured through the provision of buffers, which are designed for absorbing said loads, on the inner wall of the hydraulic cylinder or on the outer wall of the piston.

In a particularly preferred embodiment of the positional energy store, it is provided that centering means for the centering of the piston in the hydraulic cylinder are provided, specifically in particular centering means which force the piston into a setpoint position when the positional energy store is fully discharged. This is possible in particular by virtue of structures being arranged on the base of the hydraulic cylinder, which structures are engaged into by structures of complementary form provided on the base of the piston, for example pegs, which engage into complementary funnels, or beveled centering blocks which are arranged on the edge of the base of the hydraulic cylinder and which engage into corresponding recesses in the lower edge region of the piston. Said measures ensure that the positional energy store can be placed into a defined starting position in which, in particular after the lowering of the piston, there is no longer contact with a hydraulic cylinder wall. This is of major importance because, as a result of the significant pressure reduction associated with the lowering movement, any compression of piston and hydraulic cylinder wall by the hydraulic fluid is eliminated, which leads to an expansion of the piston in a radially outward direction and of the hydraulic cylinder wall in a radially inward direction. In the event of contact occurring between piston and hydraulic cylinder wall, the piston would, in the lowered state, be displaced as a result of the expansion, which could lead to damage to or destruction of the hydraulic cylinder base.

A further advantageous refinement of a positional energy store has furthermore proven to be one in which an encircling concrete ring is provided, as a bearing for the seal, on the cylinder and/or on the piston, wherein it is expressly pointed out that even a concrete ring made up of sections which together fully encircle the piston is an encircling concrete ring within the meaning of this document. In this way, particularly reliable mounting of the seal is realized.

Wall Coating

A major part of the problem of providing a suitable seal for a generic positional energy store is based on the surface structure, which can be achieved during the construction of the positional energy store, of the inner side of the hydraulic cylinder or of the outer side of the piston. This has a considerable surface roughness which firstly leads to intense wear of the seal during the raising and lowering of the piston but secondly also makes it more difficult to effectively prevent the seepage of hydraulic fluid through a seal which self-evidently lies on the maxima of the surface structure but must simultaneously also close off the minima of the surface structure.

Therefore, an object of an independent invention is the problem of realizing an improvement of the action of seals of the positional energy store regardless of the construction thereof. Said object is achieved by way of a positional energy store having a hydraulic cylinder in which there is arranged a piston for storing energy in the form of potential energy of the piston, wherein the position of the piston relative to the earth's surface is variable, having a pump by way of which a hydraulic fluid can be pumped via lines into the hydraulic cylinder such that the piston is raised, and having a generator for converting flow energy of hydraulic fluid, which is displaced from the hydraulic cylinder during the lowering of the piston, into electricity, wherein a seal is arranged between the hydraulic cylinder and the piston.

In the system described herein, the inner wall surface of the hydraulic cylinder and/or the outer wall surface of the piston are lined or coated, at least in the height region between the point against which the seal bears when the positional energy store is fully discharged and the point against which the seal bears when the positional energy store is charged to the maximum extent, with a layer which reduces the roughness of the wall surface. For example, a high-grade steel layer may be used as a layer of said type.

Drilled Pile Wall

The system described herein may be used both in combination with and independently of other portions of the system described herein discussed in this document and may include a positional energy store which is of alternative construction but which operates on the basis of the same principle. The selection of the site for a positional energy store which is formed out of the rock by way of mining methods, such as emerges from DE 10 2010 034 757 B4, is specifically restricted by geological conditions. It is useful for the stone out of which the hydraulic cylinder is formed, by virtue of the piston to be lifted being cut out or separated out, to reliably prevent the passage of hydraulic fluid even when said hydraulic fluid is under very high pressure.

It is therefore the useful to provide a positional energy store of alternative construction, the site of which can be subject to lesser demands but with which it is nevertheless possible, through the construction of the hydraulic cylinder, to ensure that the passage of hydraulic fluid is reliably prevented even when said hydraulic fluid is under very high pressure.

The system described herein provides a positional energy store having a hydraulic cylinder in which there is arranged a piston for storing energy in the form of potential energy of the piston, wherein the position of the piston relative to the earth's surface is variable, having a pump by way of which a hydraulic fluid can be pumped via lines into the hydraulic cylinder such that the piston is raised, and having a generator for converting flow energy of hydraulic fluid, which is displaced from the hydraulic cylinder during the lowering of the piston, into electricity, wherein a seal is arranged between the hydraulic cylinder and the piston.

Here, it useful that the wall of the hydraulic cylinder is formed from drilled piles composed of concrete, wherein sealing fabric mats composed of a material which is impermeable to the passage of hydraulic fluid are arranged so as to overlap one another on the inner side of the hydraulic cylinder, wherein each sealing fabric mat is anchored on a drilled pile. In particular, the sealing fabric mats may overlap one another at predetermined breaking joints.

A drilled pile is also to be understood to mean an elliptical or square wall segment which is cast into a slot which is formed into the foundation for example by milling or by way of a band saw.

At first glance, the realization of the hydraulic cylinder by way of drilled piles appears to be problematic because, although such a construction of the hydraulic cylinder can be realized in a technically effective manner, it is the case that, because the individual drilled piles could be forced apart in the presence of high internal pressure, there is the risk of interstices arising through which hydraulic fluid could then escape into the surroundings. By way of mats composed of sealing fabric which are anchored on the drilled piles, which mats overlap one another at the predetermined breaking points, that is to say at the points at which the occurrence of such interstices is most likely, said problem can however be alleviated, because said mats composed of sealing fabric are then likewise pressed with the same high internal pressure toward one another.

In a preferred refinement of the system described herein, the crotches formed between the individual drilled piles are filled with spray concrete such that the mats composed of sealing fabric lie on a smooth surface. This not only reduces the load on the mats composed of sealing fabric in the event of pressure changes but can furthermore also counteract the formation of interstices between the individual drilled piles.

It is also advantageous if the surfaces, facing toward one another, of two adjacent drilled piles are designed so as to engage into one another with an accurate fit. This may be achieved in particular by virtue of one drilled pile having, as viewed in the cross section perpendicular to the profile direction of the drilled pile, a convex section which may be formed for example by a section of a circular cross-sectional area of a cylindrical drilled pile, and an adjacent drilled pile having, as viewed in the cross section perpendicular to the profile direction of the drilled pile, a concave section whose geometry is adapted to the convex section of the adjacent drilled pile.

The wall can thus be formed by drilled piles of a first type and drilled piles of a second type, which are arranged such that the drilled piles adjacent to a given drilled pile are in each case drilled piles of the other type. For example, the drilled piles of the first type may have a circular cross section, whereas the cross section of the drilled piles of the second type is circular with concave recesses arranged on the sides facing toward the adjacent drilled piles of the first type, the curvature of which recesses corresponds to the curvature of the cross section of the drilled piles of the first type. In the case of this embodiment, it is the case that the adjacent drilled piles in each case areally adjoin one another and thereby stabilize one another. A further stabilization is realized if the crotches between adjacent drilled piles 212, 213 are sprayed with spray concrete.

To be able to ensure the sealing action of the hydraulic cylinder even in the presence of high pressure of the hydraulic fluid, which, despite the above-described measures, harbors a residual risk of crack or gap formation and thus leakage of the wall, which is thus formed, of the hydraulic cylinder, it is additionally possible, in each case on the drilled piles of the first type and/or of the second type, for sealing fabric mats composed of a material which is impermeable to the passage of hydraulic fluid to be arranged in overlapping fashion, wherein each sealing fabric mat is anchored on a drilled pile. The overlapping sections of adjacent sealing fabric mats are pressed against one another by the pressure of the hydraulic fluid, and the seepage of hydraulic fluid is thus reliably prevented.

Pot-Shaped Piston

In particular if the piston of the positional energy store cannot be formed "from the solid" from a stone block of suitable size, a way of providing a suitable piston must be found. Since, as already mentioned, it is the case for the desired storage quantities that the radial dimensions of the piston and the axial dimensions thereof are in part greatly in excess of one hundred meters, an important condition is that the piston can be produced on site. Here, the material of which the piston is composed, in particular the density thereof, is of major significance for the amount of energy that can be stored in the energy store.

It is therefore the object of this invention to provide a piston of alternative construction for positional energy stores, which piston is in particular likewise conducive to a situation in which the site of the positional energy store has to satisfy less stringent demands, but in the case of which production on site is nevertheless possible and in the case of which, furthermore, by way of the construction of the piston of the hydraulic cylinder, it can be ensured that this has as high a density as possible, which has the effect that the same amount of energy can be stored in a store with a smaller spatial extent.

Said object is achieved by way of a positional energy store having a hydraulic cylinder in which there is arranged a piston for storing energy in the form of potential energy of the piston, wherein the position of the piston relative to the earth's surface is variable, having a pump by way of which a hydraulic fluid can be pumped via lines into the hydraulic cylinder such that the piston is raised, and having a generator for converting flow energy of hydraulic fluid, which is displaced from the hydraulic cylinder during the lowering of the piston, into electricity, wherein a seal is arranged between the hydraulic cylinder and the piston.

Here, it is useful that the piston is formed by a pot which is filled with a material of a high density.

Here, a high density refers to a density of >2000 kg/m$^3$, wherein as high a density as possible is sought in order to maximize the amount of energy that can be stored in a positional energy store of a given size. A preferred filling material is for example slag such as is left over as a residual product from the production of steel, because the density thereof can reach and even exceed 3500 kg/m$^3$.

A further increase of the mass of the filled pot and thus also of the energy that can be stored in a positional energy store for a given geometry of the hydraulic cylinder is realized if the pot which serves as piston is filled such that, in the region of the central axis of the pot, the pot is filled to beyond its upper edge with filler material (e.g., filler material 123), such that, when the positional energy store has been fully emptied, the surface of the piston is elevated above ground level. In other words, the pot is filled such that, in said state, a hill of filler material is elevated above the ground, such as is the case with, for example, a sandcastle deposited onto the ground, which lies in stable fashion as long as a critical gradient angle between the ground and the straight line formed by connecting an edge point of the sandcastle and the highest point thereof is exceeded. The critical gradient angle thus defined for the filler material hill is, taking into consideration possible vibrations during the movement of the piston, approximately 30°.

Here, it is particularly preferable if the pot is in the form of a double-walled pot. In particular, the region between the walls can be filled with concrete.

The base of the pot may be formed by a shell which is filled with a concrete layer which is strong enough that, when the hydraulic fluid has been pumped out, said concrete layer, seated on the bearing blocks, supports the filler material without breaking or cracking. The wall may then be of double-walled form with an outer wall and with an inner wall and with a concrete layer which is seated on the concrete layer of the base and which is arranged between the outer wall, which is seated on the shell, and the inner wall. The outer wall, inner wall and shell may in this case be constructed for example from concrete finished elements or from steel.

This construction makes it possible for the piston to be constructed on site in sequential fashion. After the bearing blocks have been cast on the base of the hydraulic cylinder, the shell is installed, for example by being assembled from finished parts or being cast in one piece. Then, it is possible for in each case one ring of (concrete) finished parts to be placed in order to elevate the outer wall and the inner wall slightly. The form or formwork formed by said rings can then be filled with concrete, wherein preferably, a connection is produced to the concrete layer situated underneath, possibly using steel reinforcements. The section of the pot thus produced may then already be filled with filler material, such that the next section of the wall of the pot can be erected proceeding from that level and does not have to be performed from an ever greater height relative to the base of the pot.

A positional energy store with a piston of said type can be constructed sequentially and on site. For this purpose, at least the inner volume of the hydraulic cylinder is excavated, wherein, at sites at which the walls are not stable enough to form the hydraulic cylinder, the wall of the hydraulic cylinder must be erected in advance, for example using the drilled pile type of construction described above. Then, bearing points and centering devices are fitted on the base of the inner volume, with the pot then, supported thereon, being erected in sequential fashion and preferably also being filled in sequential fashion, as will be described further below by way of an example.

Wind Pressure Compensation

A problem, already discussed briefly further above, of generic positional energy stores consists in that they are sensitive to tilting. Owing to the desired lifting travel of often several hundred meters, even a slight tilting of the piston can cause said piston to become jammed in the hydraulic cylinder, even if the piston is deployed by at most half of its height. The deployed piston is however subjected to a considerable wind pressure, which moreover often increases with rising height above the ground, which wind pressure can give rise to such tilting.

This yields the problem of providing a generic positional energy store with reduced sensitivity to wind pressure.

The system described herein provides a positional energy store having a hydraulic cylinder in which there is arranged a piston for storing energy in the form of potential energy of the piston, wherein the position of the piston relative to the earth's surface is variable, having a pump by way of which a hydraulic fluid can be pumped via lines into the hydraulic cylinder such that the piston is raised, and having a generator for converting flow energy of hydraulic fluid, which is displaced from the hydraulic cylinder during the lowering of the piston, into electricity, wherein a seal is arranged between the hydraulic cylinder and the piston.

For the system described herein, on the top side of the piston, that is to say on that side of the piston which faces away from the hydraulic fluid, a ring-shaped arrangement of multiple ballast tanks is provided concentrically with respect to the central axis of the piston, wherein the fill levels of the ballast tanks are regulated independently of one another. In particular, it is preferable for said ring-shaped arrangement of ballast tanks to have a maximized radial spacing to the central axis of the piston. By virtue of the fact that the tanks, which are arranged on that side of the piston which faces toward the wind, are filled with fluid, for example with the hydraulic fluid, the tilting moment effected by the wind pressure can be compensated, and tilting of the piston can be reliably prevented. Since the fill level of the tank can be adapted to the wind speed, this applies to all wind speeds.

Despite such trimming adapted to the respectively prevailing wind pressure, which trimming holds the piston in the vertical orientation, it however remains to be noted that the piston is nevertheless forced against the lee-side seal by the wind force. Therefore, in a preferred refinement of the system described herein, a bollard ring arranged above the seal is provided for accommodating said forces.

It is explicitly pointed out that the independent portions of the system described herein may be combined with one another.

BRIEF DESCRIPTION OF THE DRAWINGS

The system described herein will be discussed in more detail below on the basis of figures, in which:

FIG. 2a shows the construction of sections of a seal according to the system, described herein in a cross section with butt-joint connection, FIG. 2b shows a longitudinal section through a carrier structure of a seal according to the system described herein, FIG. 2c shows a plan view of the carrier structure of the seal, FIG. 2d shows a schematic embodiment of the bead knot of a seal of said type, FIG. 2e shows a view of the finished bead knot of the seal, FIG. 6a is a cross-sectional illustration of a third seal arrangement with a hose-like seal in the case of a maximum gap width, FIG. 6b shows the seal arrangement as per FIG. 6a in the case of a minimum gap width, FIG. 10a shows a variant of the seal arrangement from FIG. 9a with an alternative mechanical positioning device, in the case of a maximum gap width, FIG. 10b shows the seal arrangement as per FIG. 10a in the case of a minimum gap width, FIG. 11 is a detail illustration for explaining the construction of the bellows in FIGS. 9 and 10, FIG. 17a shows the construction of a flap segment for a seal arrangement as per FIG. 12a in a view of the flap from the piston side, FIG. 17b shows a section through a seal carrier of the flap segment from FIG. 17a, FIG. 17c shows the design of the rotary joint of the flap segment, and FIG. 17d shows the design of the seal block at the interstices of individual flap segments.

DETAILED DESCRIPTION OF VARIOUS EMBODIMENTS

Figure 1A:
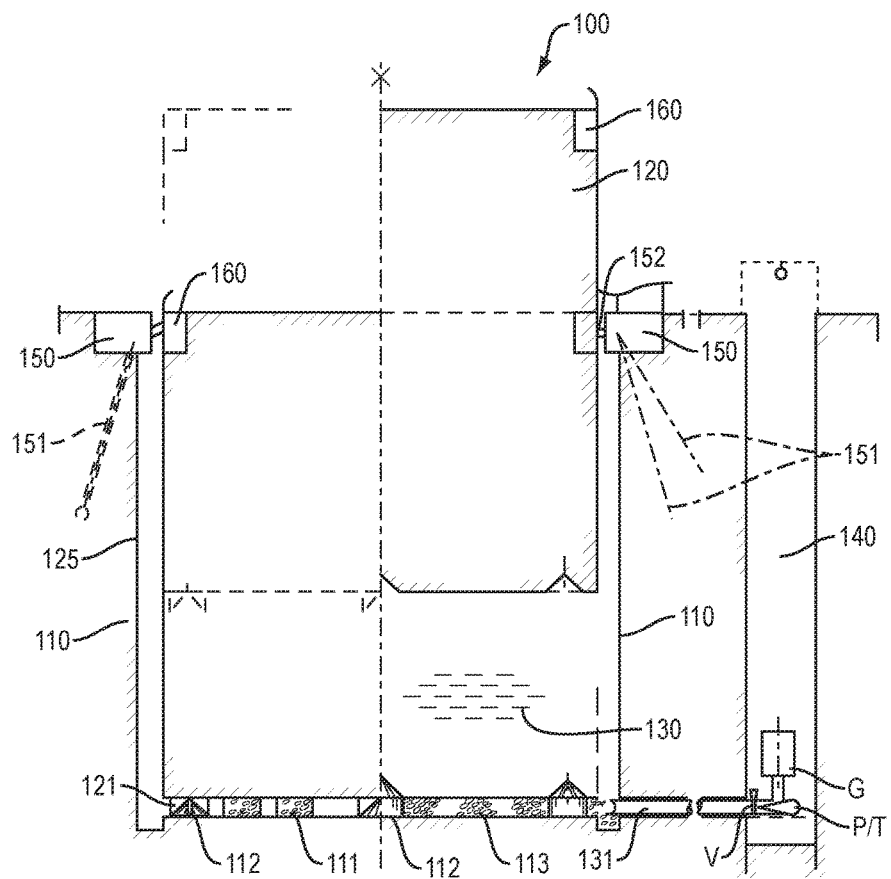
FIG. 1a is a schematic illustration of a cross section through a positional energy store.

FIG. 1a is a schematic illustration of a first embodiment of a positional energy store 100 with hydraulic cylinder 110 and piston 120 in cross section, wherein the left-hand half of FIG. 1a shows the positional energy store 100 in the state in which it is fully discharged of energy, that is to say with the piston 120 lowered, and the right-hand half of FIG. 1a shows the positional energy store 100 in the state in which it is charged with energy to the maximum extent, that is to say with the piston 120 raised by hydraulic fluid 130 that has been pumped into the hydraulic cylinder 110.

The preferred geometry of the positional energy store 100 as illustrated in FIG. 1a is as follows: the cylindrical piston 120 preferably has, in the case of a radius r, a height of 2.2r. To reduce the risk of tilting of the piston 120 in the presence of a side wind, the piston is raised by at most a distance r. To illustrate major parameters of the operation of an installation of said type, table 1 specifies, for a series of radii r, the corresponding height h, the resulting volume V and the resulting mass m of the piston in the case of an assumed density of 2.6 t/m³, the energy that can be stored in the case of a maximum lift of h, and the estimated pressure p on the seal in the case of water being used as the hydraulic fluid:

TABLE 1

| r [m] | 62.5 | 125 | 250 | 500 |
|---|---|---|---|---|
| h [m] | 138 | 275 | 550 | 1100 |
| V [m³] | 1694000 | 13499000 | 108000000 | 864000000 |
| m [t] | 4404400 | 35097400 | 280800000 | 2246400000 |
| E [GWh] | 0.6 | 9.6 | 149.0 | 2376.0 |
| p [bar] | 29 | 58 | 128 | 230 |

Bearing blocks 111 and centering pegs 112 are arranged on the base of the hydraulic cylinder 110. The centering pegs 112 engage into funnel-shaped openings 121 when the piston 120, in the fully discharged state of the positional energy store 100, is lowered so as to rest on the bearing blocks 111. Here, at least three centering pegs 112 and funnel-shaped openings 121 should preferably be provided, at positions which are not interchangeable by way of a rotation about the axis of symmetry of the piston 120. By way of this engagement, it is ensured that the piston 120 always remains in the same defined orientation in the hydraulic cylinder 110 and a rotation of the piston in the hydraulic cylinder 110 is prevented.

By way of the mounting of the piston 120 on bearing blocks 111 when the positional energy store 100 is in the fully discharged state, the raising of the piston 120 by virtue of the hydraulic fluid 130 being pumped in is facilitated, because said hydraulic fluid can act on the entire remaining underside of the piston 120. The design of the underside of the piston 120 with the funnel-shaped openings 121 and the bearing points 122 at which the piston 120 lies on the bearing blocks 111 when the positional energy store 100 is in the fully discharged state can be seen particularly clearly in FIG. 1b.

Also illustrated in sketched fashion in FIG. 1a is a transport, supply and turbine shaft 140, which runs parallel to the lifting direction of the piston 120 of the positional energy store 100, and a supply line 141 to the base of the hydraulic cylinder 110, through which supply line hydraulic fluid 130 can flow to and from the interior space of the hydraulic cylinder 120. When hydraulic fluid 130 has been pumped out and during the construction phase of the positional energy store 100, access to the interior space of the hydraulic cylinder 110 in the region of the base thereof is possible through the transport, supply and turbine shaft 140 and supply line 141.

Furthermore, in FIG. 1a, a pump P, generator G and valves or locks V, which are opened for the purposes of changing the state of charge of the positional energy store and which otherwise remain closed in order to maintain a defined fill level of hydraulic fluid, are schematically illustrated as being arranged in the supply line 141, though these may also be arranged differently. The illustration does not show a storage reservoir for the hydraulic fluid 130.

In the case of the positional energy store 100 illustrated in FIG. 1a, the upper edge of the hydraulic cylinder 110 is designed as an encircling concrete ring 150 which is braced, by way of tension anchors 151, against the rock which forms the cylinder wall 125 of the hydraulic cylinder 110. As in the enlarged illustration as per FIG. 1c, which shows the state when the positional energy store 100 has been almost completely discharged, it can be seen that the concrete ring 150 can serve as a bearing for multiple seal arrangements 152a, 152b, which in the illustration of FIG. 1a are illustrated schematically as having been combined to form the seal 152, and a backup system 153 and a positioning installation 154, and can accommodate a pipe and drain system 158a-c into which any hydraulic fluid that seeps through the seal can run off or be drawn by suction.

Figure 1B:
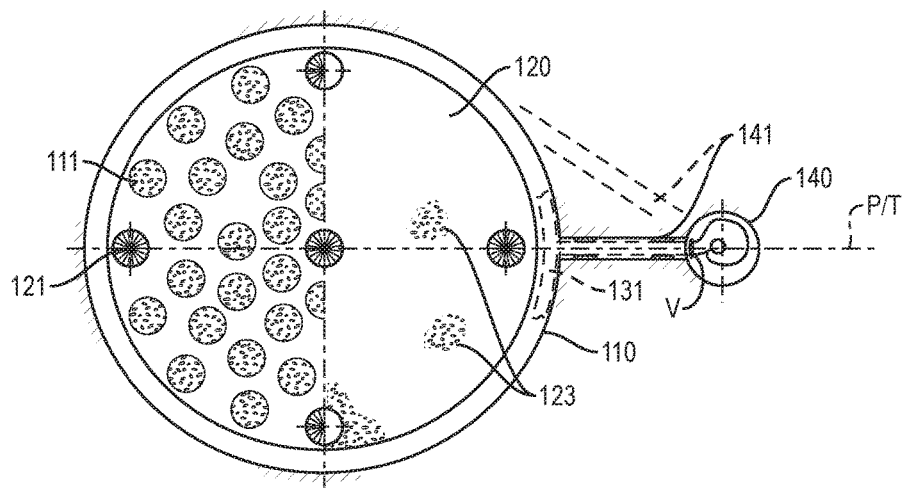
FIG. 1b shows an outline of the lifting cylinder from FIG. 1a, FIG. 1c shows an enlarged detail of the upper edge region of the lifting cylinder in the almost retracted state, that is to say when the positional energy store is discharged.
Figure 1C:
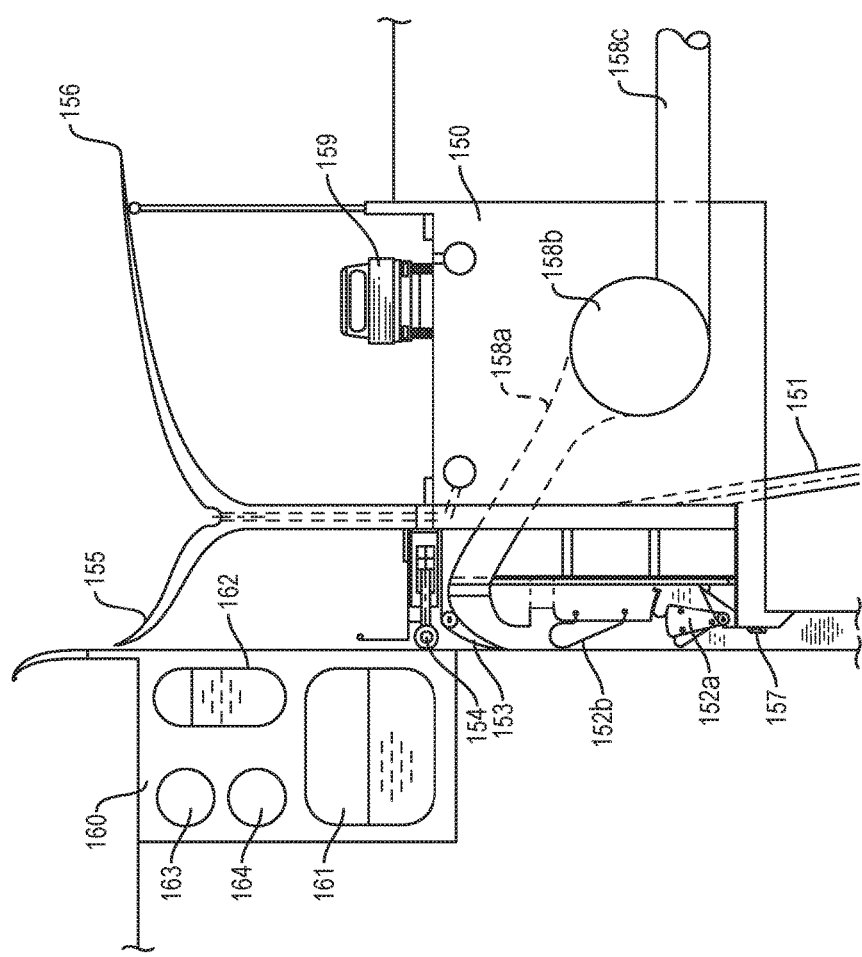
Figure 3A:
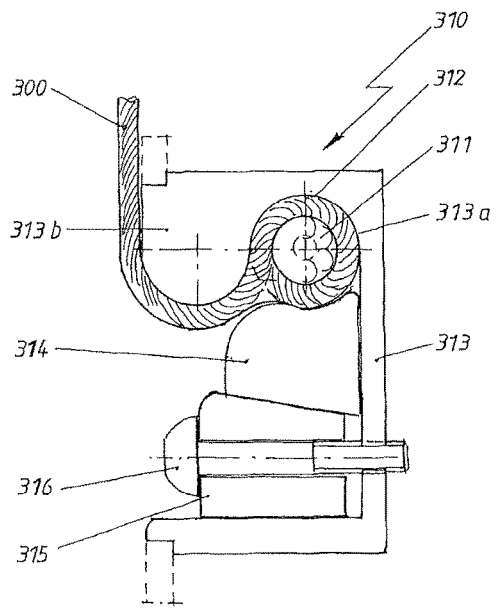
FIG. 3a shows a first variant of an anchoring for the seal, designed as a box with bolted connection.
Figure 3B:
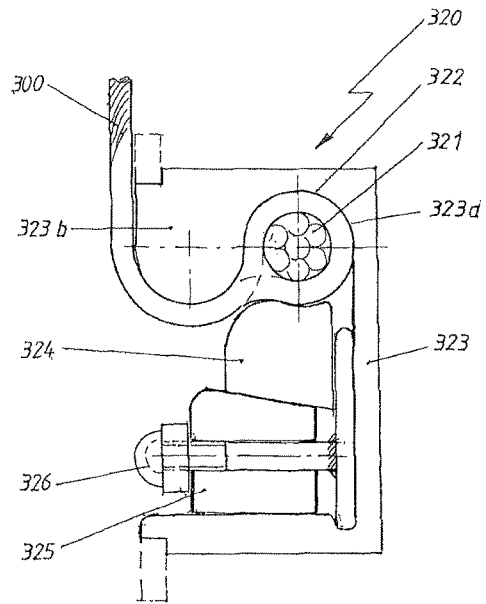
FIG. 3b shows a second variant of an anchoring for the seal, designed as a box with a bolted connection.
Figure 3C:
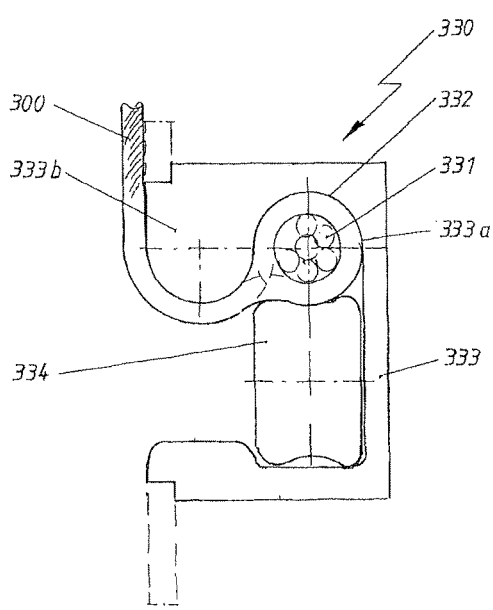
FIG. 3c shows a third variant of an anchoring for the seal, designed as a box with a blocking means.
Figure 3D:
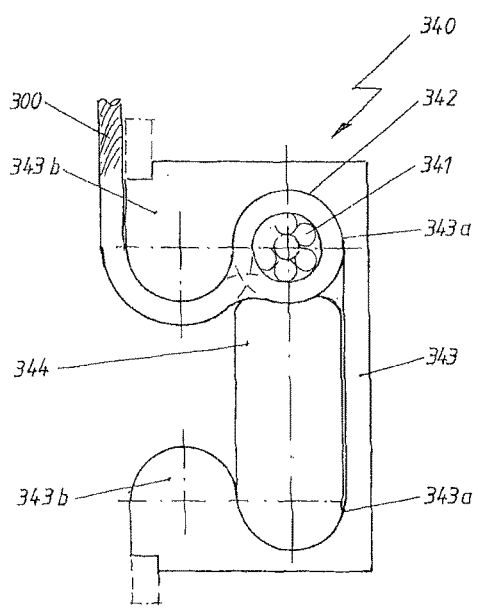
FIG. 3d shows a fourth variant of an anchoring for the seal, designed as a box with a blocking means.
Figure 3F:
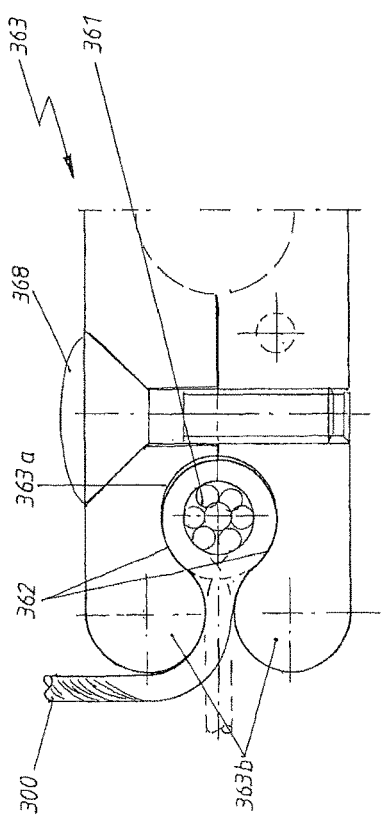
FIG. 3f shows a sixth variant of an anchoring for the seal, designed as a clamping block.
Figure 3H:
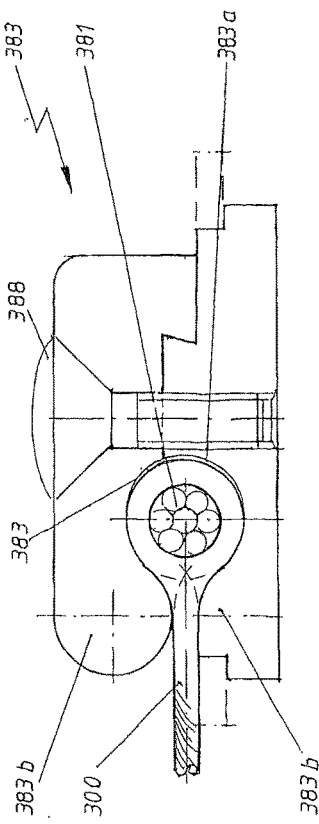
FIG. 3h shows an eighth variant of an anchoring for the seal, designed as a clamping block.
Figure 3E:
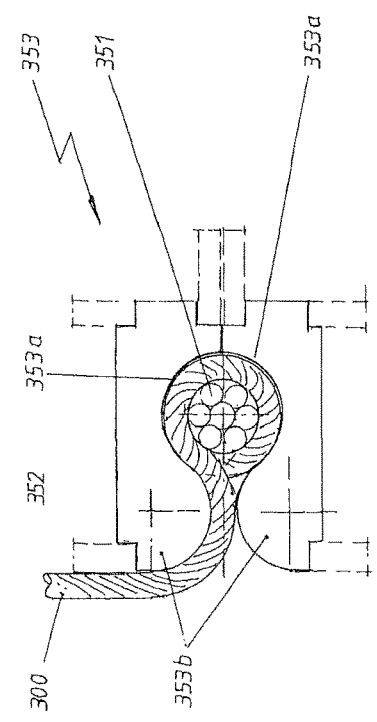
FIG. 3e shows a fifth variant of an anchoring for the seal, designed as a clamping block.
Figure 3G:
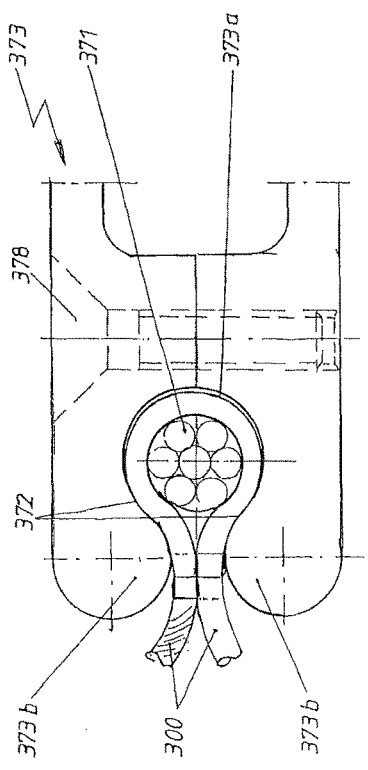
FIG. 3g shows a seventh variant of an anchoring for the seal, designed as a clamping block.

Furthermore, the concrete ring 150 may, as illustrated in FIG. 1c, bear an encircling protective roof 156 with a stripper 155, which prevent articles or rainwater that runs down the deployed piston 120 from being able to pass into the gap between the inner wall of the hydraulic cylinder 110 and the piston 120. A further function of the encircling concrete ring 150 is that it can, as indicated by the depicted maintenance vehicle 159, serve as a service road.

An encircling buffer 157 is expediently also arranged on the concrete ring.

It can likewise be seen particularly clearly in FIG. 1c that an encircling concrete ring 160 is provided in the upper edge region of the piston 120 of the positional energy store 100, which concrete ring has, in particular, ballast tanks 161 for trimming for counteraction of wind pressure and ballast tanks 162 for trimming of the center of gravity of the hydraulic cylinder, which tanks can be filled and evacuated via the pipe systems 163, 164 by way of pumps (not illustrated).

The wind acts on that part of the piston 110 which is deployed above the ground. The resulting wind action force leads to a tilting moment which can be compensated by filling the tanks arranged on that side of the piston 120 which faces toward the wind, though this leads to a transverse offset of the piston 120 in the lee direction, such that the axes of symmetry of hydraulic cylinder 110 and piston 120 no longer coincide, thus giving rise to an increase of the gap between the piston 120 and hydraulic cylinder 110 on the windward side and a decrease of the gap between piston 120 and hydraulic cylinder 110 on the lee side, which must self-evidently be compensated by the seal.

Table 2 shows an estimated overview of the required tank cross-sectional areas as a function of the radius of the piston, under the assumption that it should be possible to compensate a wind speed of (up to) 180 km/h.

TABLE 2

| r [m] | 62.5 | 125 | 250 | 500 |
|---|---|---|---|---|
| Wind action surface area [m²] | 7812 | 31250 | 125000 | 500000 |
| Wind pressure [kN] | 11875 | 47500 | 190000 | 760000 |
| Tilting moment [kNm] | $520 \cdot 10^3$ | $416 \cdot 10^4$ | $333 \cdot 10^5$ | $266 \cdot 10^6$ |
| Tank cross-sectional area [m²] | 6 | 12 | 24 | 48 |

FIG. 2a shows the construction of sections 210, 220 of a seal 200 which is constructed according to the system described herein, and which in this example is assembled from sections 210, 220 of said type, in a cross section along a direction which, when the seal 200 is in an installed state, corresponds approximately to a tangent with respect to the piston 120 or runs parallel to said direction. It is however basically also possible for the seal to be manufactured in one piece.

The figure shows, as flexible carrier structure, steel cables 212, 222 which are braided from fiber bundles 211, 221, wherein the steel cables 212 of the section 210 run substantially adjacent to one another and the steel cables 222 of the section 220 run substantially adjacent to one another. The steel cables 212 or 222 may in each case be separate cables, though may also be sections of one or a small number of cables which are diverted at the ends of the seal, as will be discussed in more detail further below on the basis of FIGS. 2c to 2e.

When the seal 200 is in an installed state, at least one component of the direction of extent of the carrier structure runs substantially radially with respect to the piston 120 or radially with respect to the central axis of the hydraulic cylinder.

The flexible carrier structure formed by the steel cables 212, 222 is, in this exemplary embodiment, coated on both sides with fluid-impermeable fabric 213, 223, which forms the fluid-impermeable layer. A further improvement in the stability of the seal 200 is realized by virtue of the intermediate spaces 214, 224 between the steel cables 212, 222, which form the flexible carrier structure, being filled with natural rubber, rubber, plastic or some other elastic and fluid-impermeable material.

To be able to connect the sections 210, 220 to one another, the section 210 has, on its top side, a section 216 in which the fluid-impermeable layer is of relatively thin form, and on its bottom side, a section 217 of fluid-impermeable fabric which projects beyond the flexible carrier structure toward the right, whereas the section 220 has, on its bottom side, a section 226 in which the fluid-impermeable layer is of relatively thin form, and on its top side, a section 227 of fluid-impermeable fabric which projects beyond the flexible carrier structure toward the left. For the connection of the sections 210, 220, a joint overlap is firstly produced between the sections 216 and 227 and the sections 217 and 226 respectively, and then said sections are in each case adhesively bonded and/or welded to one another in shear-resistant and pressure-resistant fashion. A length of the sections of approximately 5 to 10 cm has proven to be expedient here.

FIG. 2b shows a longitudinal section through a seal 200 according to the system described herein, as shown in FIG. 2a, along one of the steel cables 212 which form the flexible carrier structure. Aside from the steel cable 212, it is also possible to see the coating thereof on both sides with fluid-impermeable fabric 213. As can be seen in FIG. 2b, it is expedient for loops 218, 219 to be provided on each of the ends of the carrier structure, which loops may be formed for example by portions wound around bead cables 230, 231. The resulting enlargement of the diameter of the flexible carrier structure at its end sections can advantageously be utilized for the anchoring thereof on the piston 120 or hydraulic cylinder 110, as illustrated by way of example in FIG. 2b by way of the sketched bracket 240, which is realized by virtue of an upper half 241 and a lower half 242 being bolted together.

FIG. 2c shows a plan view of the carrier structure of the seal 200 if the latter is formed from sections 212a, 212b, which run adjacent to one another, of a steel cable 212 which, in each case at the end of a section, is wound around bead cables 230 and 231 respectively. As a result of the wound-around portion, the sections 212a run on that side of the bead cables 230 and 231 which faces toward the viewer in FIG. 2c, whereas the sections 212b run on the side facing away from the viewer, that is to say run deeper as viewed in the direction of the plane of the paper. To keep the interstices between the respective sections 212a and 212b small, it is advantageous, as illustrated by way of example in FIG. 2d for the bead cable 232, for a high-grade steel band 232 to be braided in immediately before or after the winding around the bead cable 230 and 231 respectively and by virtue of the sections 212a and 212b being braided with a synthetic fiber braiding 233 in order to pull the sections 212a, 212b into a plane. By way of said measures, it is made possible for the width of the interstices 235 between the sections 212a and 212b to be reduced to one or a few mm.

The production of the wound-around portions, which can be seen in FIG. 2c, of the bead cables 231, 232 by way of sections 212a, 212b of the steel cables 202 and the braiding thereof with the loop band 232 and synthetic fiber braiding 233 is depicted in FIG. 2d and the result, viewed from the profile direction of the steel cables 212, is illustrated in FIG. 2e.

For the arrangements described above in FIGS. 2a to 2e, but also generally for all arrangements, with sections of a carrier structure running adjacent to one another, it has proven to be highly advantageous if, between said sections which run adjacent to one another, and/or as a cover layer, use is made of an elastic material which is both stretchable and compressible, wherein, for the and alternative of the above "and/or" combination, the stretchability and compressibility of the material which is arranged in the intermediate space between the sections running adjacent to one another and of the cover layer should preferably be coordinated with one another. Through the use of materials with said characteristics in said arrangement, it is specifically the case that the problem whereby, for example as a function of the wind offset, a given segment of a seal must seal off a gap of variable width, such that the length of the segment in the circumferential direction of the piston must also change, is solved.

The components referred to as "sealing section" in the following figure descriptions relating to FIGS. 4 to 17 have, in each case, a flexible carrier structure for accommodating the acting forces, which carrier structure is coated on one or both sides with a fluid-impermeable layer for sealing against the passage of fluid, or is impregnated with a solidified fluid-impermeable material, and said components are for example in each case constructed as has been discussed above on the basis of FIGS. 2a to 2e.

FIGS. 3a to 3h show, in each case in a cross-sectional view, anchorings 310, 320, 330, 340, 350, 360, 370, 380 by way of which a seal end section 312, 322, 332, 342, 352, 362, 372, 382, formed in each case by way of a wrapped-around portion of a bead cable 311, 321, 331, 341, 351, 361, 371, 381, can be anchored in the inner wall (not illustrated in these figures) of the hydraulic cylinder or in the piston. In particular, such anchorings 310, 320, 330, 340, 350, 360, 370, 380 can be used to realize the anchoring of seals where an anchoring is mentioned below in the descriptions of the figures relating to the exemplary embodiments as per FIGS. 4 to 17.

Here, all anchorings 310, 320, 330, 340, 350, 360, 370, 380 have in common the fact that they each have an anchor box 313, 323, 333, 343, 353, 363, 373, 383 which is fastened in, for example cast or clamped in, the piston or the hydraulic cylinder of a positional energy store. All anchor boxes 313, 323, 333, 343, 353, 363, 373, 383 have in common the fact that they have a recess 313a, 323a, 333a, 348a, 353a, 363a, 373a, 383a into which the seal end section 312, 322, 332, 342, 352, 362, 372, 382 is placed and that they have at least one guide section 313b, 323b, 333b, 343b, 353b, 363b, 373b, 383b around which a section of the seal is guided in order to reliably prevent kinking of the seal and to permit a controlled dissipation of the acting tensile forces. The placed-in seal end section 312, 322, 332, 342, 352, 362, 372, 382 is then fixed in its position. This may be realized for example by way of clamping means, by way of wedges, by way of a projection in the anchor box and by way of encapsulation by spraying, spraying from behind or spraying from below, for example with concrete.

In particular, the positional energy stores 100 described in FIGS. 1a to 1c may be equipped with the seal arrangements described below in FIGS. 4 to 17. The seal arrangements are in each case arranged such that a gap which remains between the hydraulic cylinder 110 and piston 120 is closed off by way of said seal arrangements, wherein the seal arrangement may also include a bearing which is arranged partially in the outer wall of the piston or in the inner wall of the hydraulic cylinder and which projects into the gap and partially closes off said gap, for example a projecting concrete ring. For this reason, to avoid repetitions and to focus the description on the essential aspects, the following descriptions of the figures will refer merely to said outer wall of the piston or inner wall of the hydraulic cylinder, without explicitly discussing the individual constituent parts of the positional energy store again in each case.

In FIGS. 4 to 17 described below, the seal is arranged in each case on the inner wall of the hydraulic cylinder 110, such that the sealing section bears against the outer wall of the piston 120, though an arrangement on the outer wall of the piston 120 would basically also be possible by simply interchanging the sides, such that the sealing section bears against the inner wall of the hydraulic cylinder 110.

The level at which the seal arrangement is attached is, in the case of most seal arrangements, not strictly predefined but can be varied, wherein it is to be noted that the seal arrangement should be arranged on the lower half of the piston 120 or on the upper half of the hydraulic cylinder 110, because otherwise, the seal arrangement would not be arranged between the piston 120 and hydraulic cylinder 110 in all operating positions of the piston 120 of the positional energy store 100.

However, an arrangement at the upper edge of the hydraulic cylinder 110 has the advantage that installation is possible with relatively little outlay.

Figure 4D:
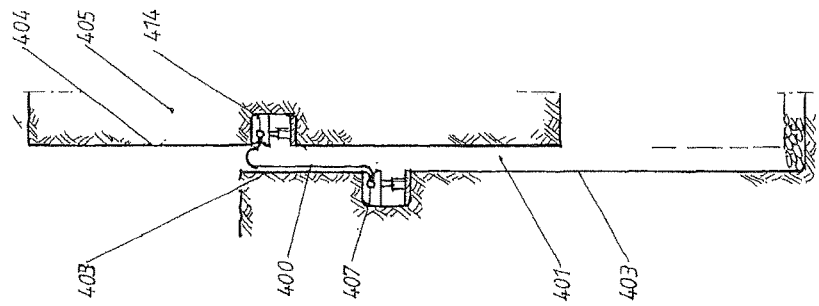
FIG. 4d is a schematic illustration of the position of the seal arrangement from FIG. 4a in the case of a fully charged positional energy store.
Figure 4C:
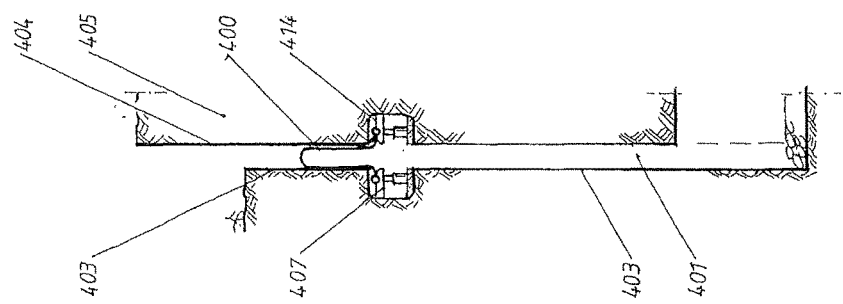
FIG. 4c is a schematic illustration of the position of the seal arrangement from FIG. 4a in the case of a semi-charged positional energy store.
Figure 4B:
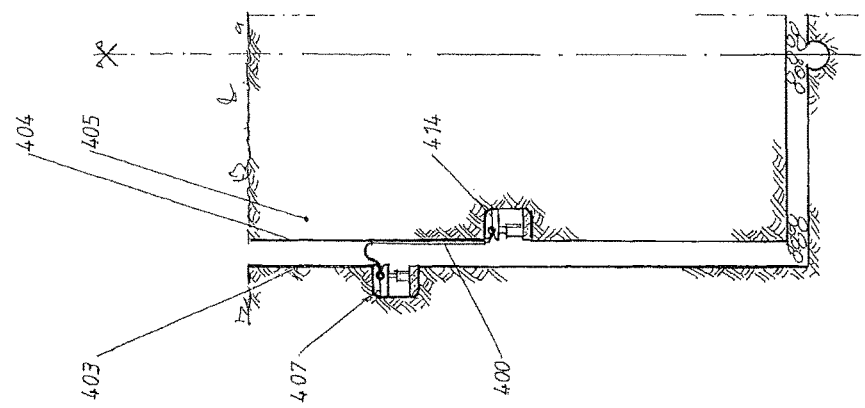
FIG. 4b is a schematic illustration of the position of the seal arrangement from FIG. 4a in the case of a fully discharged positional energy store.
Figure 4A:
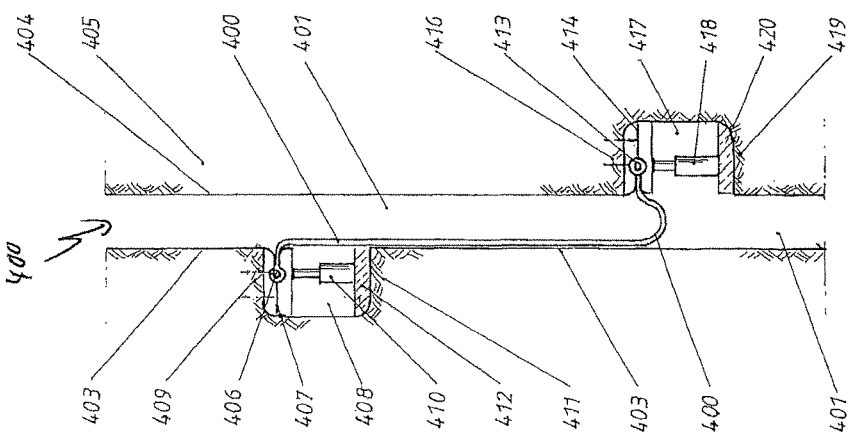
FIG. 4a shows a cross-sectional illustration of a first seal arrangement, designed as a rolling diaphragm.

FIG. 4a shows a seal arrangement composed of a seal 400, which is in the form of a rolling diaphragm, in cross section. Here, the seal 400 may be constructed as described above on the basis of FIGS. 2a to 2e. In the case of the seal 400, which seals off a gap 401 of width b between inner wall 403 of the hydraulic cylinder and the outer wall 404, facing toward said inner wall, of the piston 405, the sealing section is formed by the entire seal 400 and is therefore not denoted by a separate reference designation. In other words, the seal 400 is, over its entire length, wherein the length is defined by the maximum spacing of the ends 406, 413 of the seal 400, sealed off against the passage of hydraulic fluid by way of a fluid-impermeable layer applied to a carrier structure formed for example by steel cables. The length of the seal 400 should be greater than half of the radius r of the positional energy store, specifically preferably by a few percent of the radius r. For example, a length of the seal of 0.52*r can be used in an effective manner. Said excess length is required not only to be able to compensate a possible lateral offset of the piston 405 in the hydraulic cylinder owing to wind pressure but also permits, as discussed below on the basis of FIGS. 4b to 4d, an adaptation of the shape of the seal 400 to the prevailing pressure of the hydraulic fluid, which is advantageous for the definition of the direction of the acting forces.

The seal 400 is, with one end 406, fastened by way of a bearing 407, which may for example be designed in the manner of one of the anchorings illustrated in FIGS. 3a-h and which is situated in a recess 408 of the inner wall 403 of the hydraulic cylinder, to the top 409 of the recess 408. The bearing 407 is additionally supported, for the purposes of securing it in position, by way of a plunger 410 on an encircling concrete ring 412 which is arranged on the base 411 of the recess 408 and which serves as plunger foundation.

The other end 413 of the seal 400 is fastened by way of a bearing 414, which may likewise be designed for example in the manner of one of the anchorings illustrated in FIGS. 3a-h and which is situated in a recess 417 on the outer wall 404 of the piston 405, to the top 416 of the recess 417. The bearing 414 is additionally supported, for the purposes of securing it in position, by way of a plunger 418 on an encircling concrete ring 420 which is arranged on the base 419 of the recess 417 and which serves as plunger foundation.

FIGS. 4b to 4d schematically show the position of the seal 400 in the case of different lifting heights of the piston 405 relative to the hydraulic cylinder, corresponding to different states of charge of the positional energy store, on the basis of a detail from a cross-sectional illustration of the positional energy store showing an inner wall 403 of the hydraulic cylinder, the gap b and the outer wall 404 of the piston.

When the piston is fully lowered, as illustrated in FIG. 4b, the seal 400 is almost entirely pressed by the pressure of the hydraulic fluid against the outer wall 404 of the piston. Since the length of the seal 400 is greater than the distance between the two bearings 407, 414, a section of the seal 400 is raised slightly above the higher one of the bearings 407 by the pressure of the hydraulic fluid, and then leads back in an arc to the bearing 414.

When the piston is half raised, as illustrated in FIG. 4c, both bearings 407, 414 are situated at the same height, such that the seal 400 is almost entirely freely movable and is thus pressed by the pressure of the hydraulic fluid against the inner wall 403 of the hydraulic cylinder and against the outer wall 404 of the piston 405, wherein said sections transition into one another via an arc-shaped connection.

When the piston is fully raised, as illustrated in FIG. 4d, the seal 400 is almost entirely pressed by the pressure of the hydraulic fluid against the inner wall 403 of the hydraulic cylinder. Since the length of the seal 400 is greater than the distance between the two bearings 407, 414, a section of the seal 400 is raised slightly above the higher one of the bearings 414 by the pressure of the hydraulic fluid, and then leads back in an arc to the higher bearing 407.

Viewing FIGS. 4b to 4d, it is in particular clear that the acting forces act primarily parallel to the lifting direction and are dependent on the gap width b. At the same time, it is clear that, with said seal construction, a change in the width b of the gap 401 can be handled without problems.

Figure 5C:
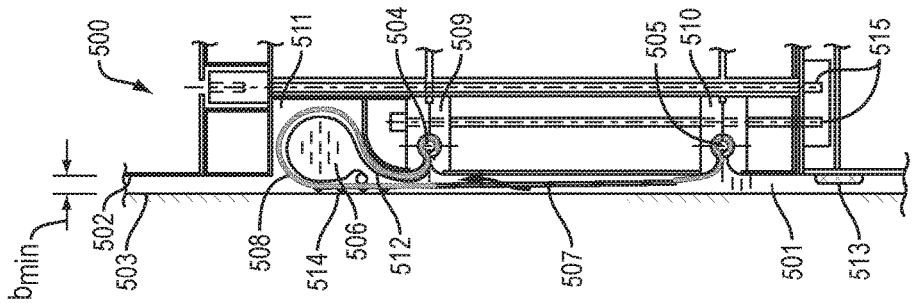
FIG. 5c shows the seal arrangement as per FIG. 5a in the case of a minimum gap width.
Figure 5B:
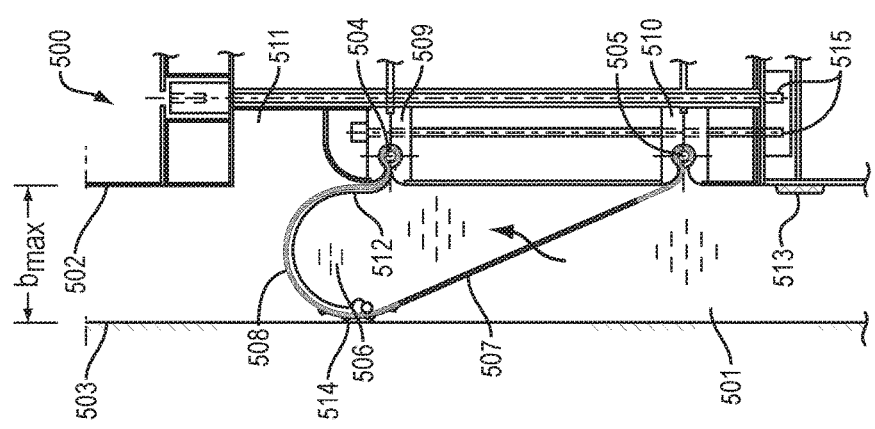
FIG. 5b shows the seal arrangement as per FIG. 5a in the case of a maximum gap width.
Figure 5A:
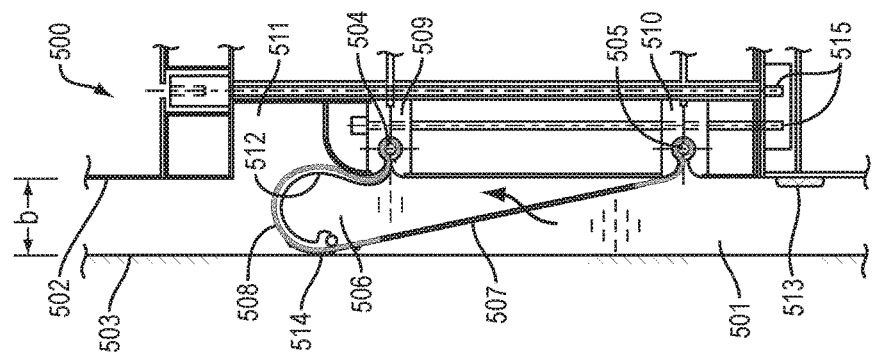
FIG. 5a is a cross-sectional illustration of a second seal arrangement with a canopy-like seal in the case of a maximum gap width.

FIG. 5a shows another embodiment of a seal arrangement having a seal 500 which seals off the gap 501 of width b between the inner wall 502 of a hydraulic cylinder and the outer wall 503 of a piston, as viewed in a cross section through a plane of the piston which encompasses the lifting axis thereof. From the radial symmetry of the piston, which has a cylindrical basic shape, it follows that the seal 500 forms a sealing sleeve which surrounds the piston radially with respect to the lifting direction thereof. Both ends (or edges) 504, 505 of the seal 500 are anchored in each case in bearings 509, 510 which are recessed in the hydraulic cylinder or in the inner wall 502 thereof, giving rise to a double-layer sealing sleeve, whose non-mounted middle part arranged in the gap 501 has, as viewed in cross section, the shape of a loop 506, the length of which is several times greater than the maximum gap width, that is to say in particular greater than the maximum gap width by more than a factor of 2.

Here, the loop 506 has a section 507, which is permeable to hydraulic fluid and which is illustrated in FIG. 5 without hatching, and a sealing section 508, which is illustrated in FIG. 5 with hatching. The section 507 which is permeable to hydraulic fluid, and which may be composed for example only of the flexible carrier structure without a fluid-impermeable coating, or which may be produced therefrom through the creation of ducts in a structure of said type, forms in this case a lower side, facing toward the hydraulic fluid, of the loop 506 or of the double-layer sealing sleeve, such that the lower side of the loop 506 is, at least in sections, permeable to the passage of hydraulic fluid. The sealing section 508 forms the upper layer and the curved section of the loop 506, in which the upper layer of the loop 506 transitions into the lower layer of the loop 506.

Said construction has the effect of ensuring that a loop 506, when it is not yet fully sealing off the gap 501, such that a flow of hydraulic fluid occurs, hydraulic fluid passes through that section 507 of the loop 506 which is permeable to hydraulic fluid, builds up at the sealing section 508, which then unfurls the loop 506 in the manner of a parachute in an air stream and ensures that a part of the sealing section 608 is pressed against the outer wall 503 of the piston and, in this way, reliable sealing is ensured.

Owing to this analogy, a seal which is designed in this way but which is anchored or mounted at other locations and which can also serve as a constituent part of alternative seal arrangements described in detail further below, is referred to in this description as "canopy seal".

Owing to the configuration of the middle part of the seal 500 as a loop 506 with a length which amounts to several times the maximum width of the gap 501 and which is arranged in the gap 501, it is ensured that the seal 500 can perform its function substantially without being influenced by a variation of the width b of the gap 501. If the gap 501 becomes wider, as illustrated in FIG. 5b, the apex of the loop 506 sinks downward, and the radius of curvature of said loop becomes greater. If the gap 501 becomes narrower, as illustrated in FIG. 5c, the apex of the loop 506 rises upward, and the radius of curvature of said loop becomes smaller.

A problem could however arise if the width b of the gap 501 decreases to zero, as illustrated in FIG. 5c. Therefore, in FIGS. 5a to 5c, in that region of the hydraulic cylinder which adjoins the bearings 509, 510 in the lifting direction, a recess 511 is provided in the inner wall 502 of the hydraulic cylinder, in which recess the loop 506 is received when the width b of the gap decreases to almost zero, such as may arise for example on the leeward side of a positional energy store, in the case of which the tilting of the piston under the action of wind pressure is compensated, in the event of a hurricane. In said recess there may also be arranged a loop carrier which predefines a minimal opening of the loop 506 and thereby ensures the unfurling thereof across the gap 501. Alternatively, as in the embodiment illustrated, it is also possible for a pressure-exerting and holding spring 512 to be jointly anchored in the upper bearing, which pressure-exerting and holding spring presses the sealing section 508, in all positions, against that wall which is situated opposite the bearings.

FIGS. 5a-c also each show anchorings 515 and optional sealing lips 514.

FIG. 6a shows a hose-like seal 600 which is in the form of a sealing sleeve which radially surrounds the piston and in the case of which the gap 601 of width b between outer wall 604 of the piston 605 and inner wall 603 of the hydraulic cylinder is sealed off by way of a sealing section 608 which is arranged in the gap 601 to be sealed off, which sealing section forms a loop 609 as viewed in the illustrated cross-sectional plane through the piston which encompasses the longitudinal axis thereof. Here, both ends 606, 613 or edges of the sealing sleeve are anchored in two bearings 607, 614 which are recessed in the hydraulic cylinder or in the inner wall 603 thereof, such that, in each case, a double-layer sealing sleeve is formed, wherein the non-mounted middle part, which forms the loop 609, points upward between the ends 606, 613 and has a length which is greater than two times the maximum spacing between the outer wall 604 of the piston and the inner wall 603 of the hydraulic cylinder by at least 200%, preferably 300%.

Since, in the case of this construction of the seal 600, at least the entire part of the loop 609 arranged in the gap b is formed by the sealing section 608, it is necessary to prevent the pressure of the hydraulic fluid from simply compressing the loop 609 and thereby permitting an escape of hydraulic fluid. This is achieved in that hydraulic fluid can enter a pipe system and can enter the interior of the loop 609 through feed lines 611, 612, such that said loop cannot be simply compressed.

It is expedient, but not imperative, for the feed line to the interior space of the loop 609 to be connected, as illustrated in FIGS. 6a and 6b, to a pressure-increasing pump 615 and to a gas pressure accumulator 616 with compressor 617, such that the hydraulic fluid which fills the interior space of the loop 609 is subjected to a pressure which is higher, for example by 5%, than the pressure of the hydraulic fluid. Said increased pressure in the interior space of the loop 609 has the effect in particular that that part of the sealing section 608 which is in contact with the outer wall 604 of the piston is pressed with high pressure against the outer wall 604 of the piston, which yields the desired effect that the fluid-impermeable layer is pressed into a surface structure that may be provided on the outer wall 604 of the piston, and thus a seepage of hydraulic fluid is prevented more effectively.

As is clear in particular in FIG. 6b, it is the case here, too, that a recess 602 is provided in the hydraulic cylinder or in the inner wall 603 thereof, in which recess the loop 609 can be received in the case of a minimum gap spacing.

Figure 7A:
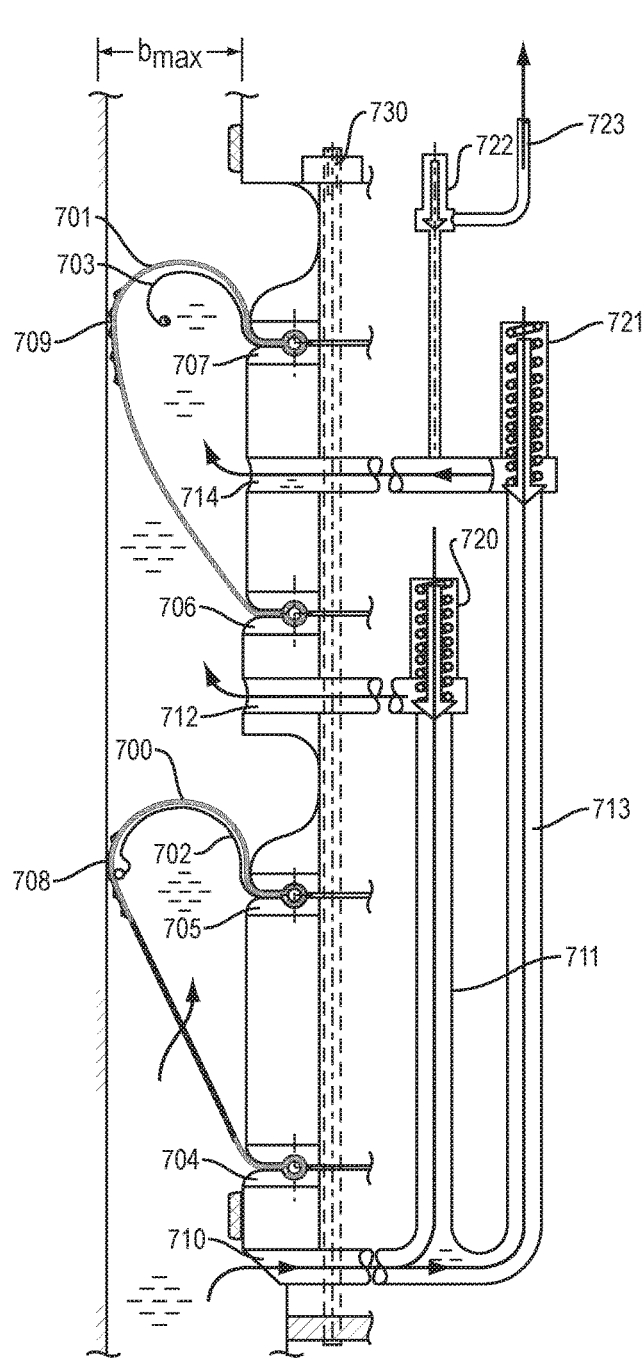
FIG. 7a is a cross-sectional illustration of a two-stage seal arrangement which is based on a combination of the second and third seal arrangements from FIGS. 5a and 6a, which seal arrangement is made up of two hose-like seals, in the case of a maximum gap width.

FIG. 7a shows a cross-sectional illustration of a two-stage seal arrangement which is made up of a of analogous construction to FIG. 5a. Two canopy-like seals 700 of substantially identical construction and arranged one above the other and a hose-like seal 701 substantially correspond in terms of construction in each case to the seals shown in FIGS. 5a and 6a, to the description of which reference is made in each case.

In the exemplary embodiment of FIG. 7 with two-stage sealing action, a pressure reducer 720 is provided in the pipe system upstream of the feed line 712, which pressure reducer for example reduces the pressure of the hydraulic fluid to 50% of the pressure prevailing at the lower seal 700. In particular, through feed line 712, that region of the gap which is situated between the lower seal 700 and the upper seal 701 can be filled with hydraulic fluid which is at a reduced pressure. This can lead to a reduction in load on the lower seal 700. It is basically also possible for more than two such sealing stages to be provided, such that a large overall pressure difference to be handled can be dissipated by virtue of multiple seals being connected in series, the loading of which seals is reduced in each case by exertion of load from above by hydraulic fluid at lower pressure.

Figure 7B:
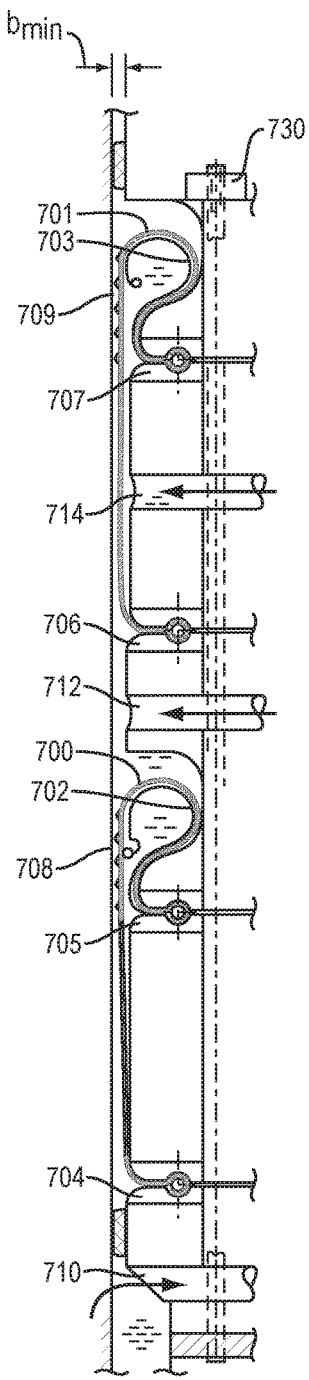
FIG. 7b shows the seal arrangement as per FIG. 7a in the case of a minimum gap width.

FIG. 7b is an illustration of the two-stage seal arrangement from FIG. 7a in the case of a minimum gap width.

Figure 8A:
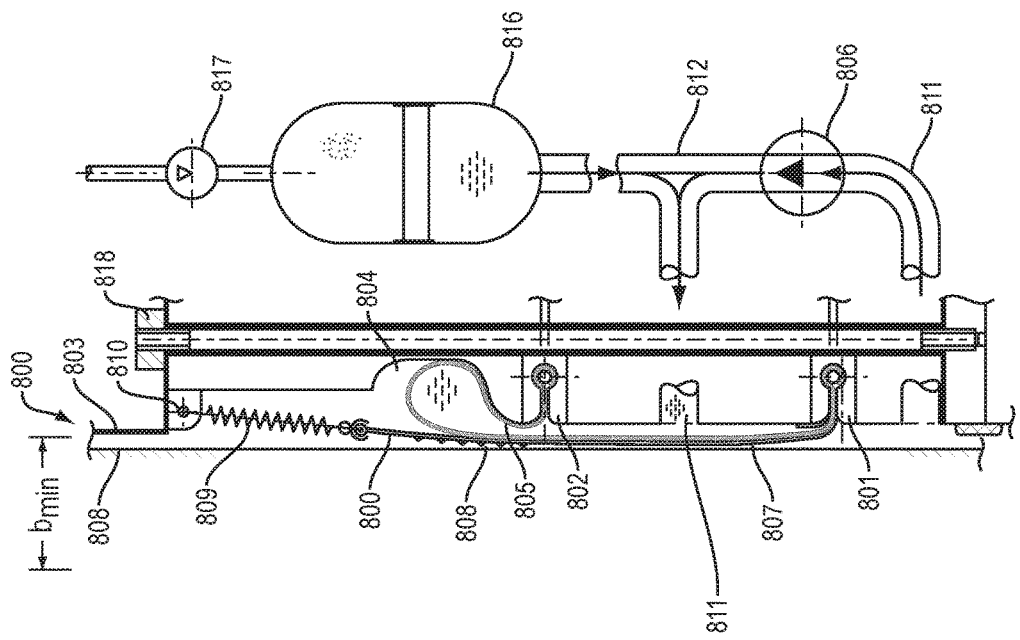
FIG. 8a is a cross-sectional illustration of a fourth seal arrangement with pressure hose and sealing skirt, in the case of a maximum gap width.

FIG. 8a shows a cross-sectional illustration of a fourth seal arrangement, based on the principle of a sealing skirt, in the case of a maximum gap width. The seal 800 illustrated in FIG. 8a is anchored on an upper bearing 801 and a lower bearing 802, which are both arranged in the inner wall 803 of the hydraulic cylinder.

Here, a section of the seal 800 covers a pressure hose 805 which runs radially around the piston. The pressure hose 805 can, by way of the line system 811, 812 with pressure-increasing pump 806 and gas pressure accumulator 816 with compressor 817, be subjected to a pressure which is higher than the hydraulic fluid pressure prevailing at the seal 800, such that the pressure hose 805 expands into a gap 807 of width b between the inner wall 803 of the hydraulic cylinder and the outer wall 808 of the piston, and the seal 800 is pressed in all directions perpendicular to the lifting direction into contact, at a contact point, with the outer wall 808 of the piston. In FIG. 8a, the entire seal 800 forms the sealing section, though it must extend at least from the lower bearing 802 as far as the contact point in order that no hydraulic fluid can escape. A clamping system 818 is also shown.

In the exemplary embodiment of FIG. 8a, the anchoring of the seal 800 in the upper bearing 801 is realized by way of a tension spring 809. This has the effect that the anchoring of the seal 800 in the upper bearing 801 is movable such that it compensates the change in the travel length from the lower bearing 802 via the surface of the pressure hose 805 to the upper bearing, such as is associated with the expansion of the pressure hose 805.

Figure 8B:
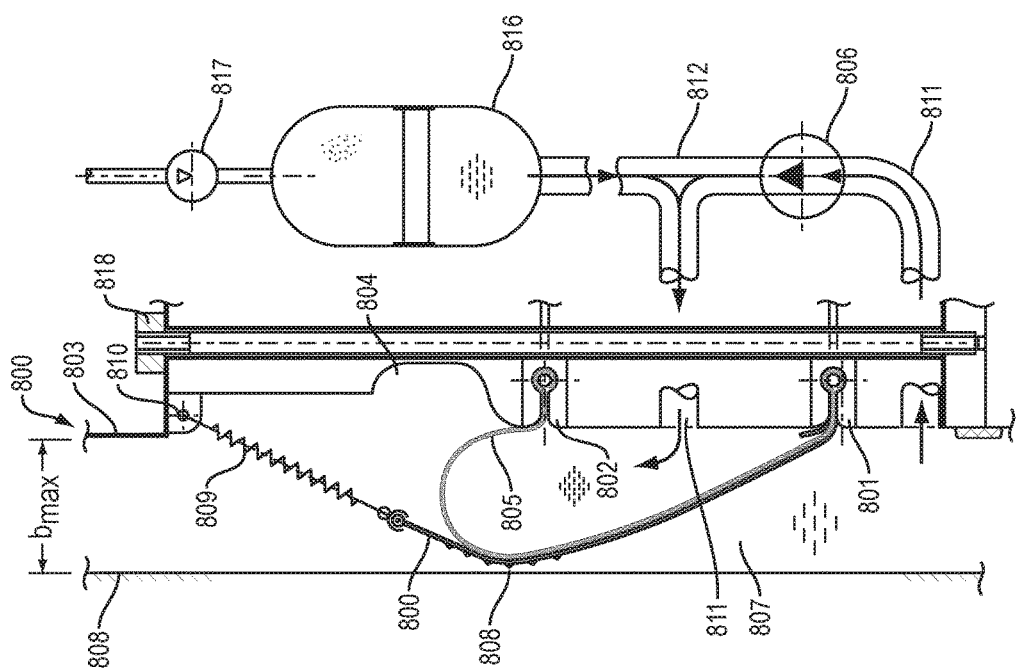
FIG. 8b shows the seal arrangement as per FIG. 8a in the case of a minimum gap width.

As emerges from FIG. 8b, which shows the seal 800 in the case of a different gap width to that in FIG. 8a, a variable gap width is in this case compensated in that the pressure hose 805 expands, or is capable of expanding, to different extents, and thus the reliable sealing can be ensured independently of variable gap widths. In the case of a minimum gap width, said pressure hose can be received in the recess 804.

Figure 9A:
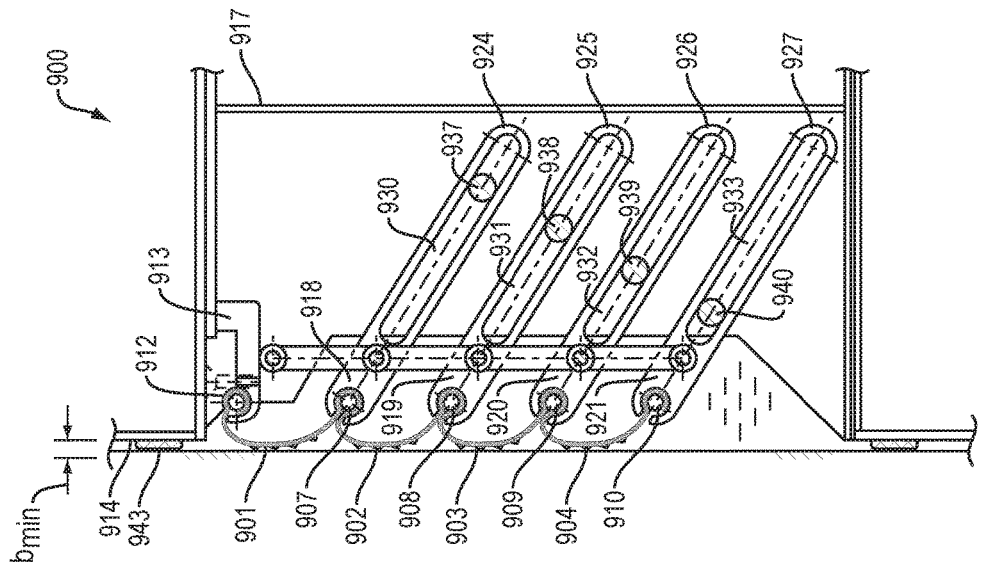
FIG. 9a is a cross-sectional illustration of a fifth seal arrangement, based on a seal which is designed as a bellows and which has a first mechanical positioning device, in the case of a maximum gap width.
Figure 9B:
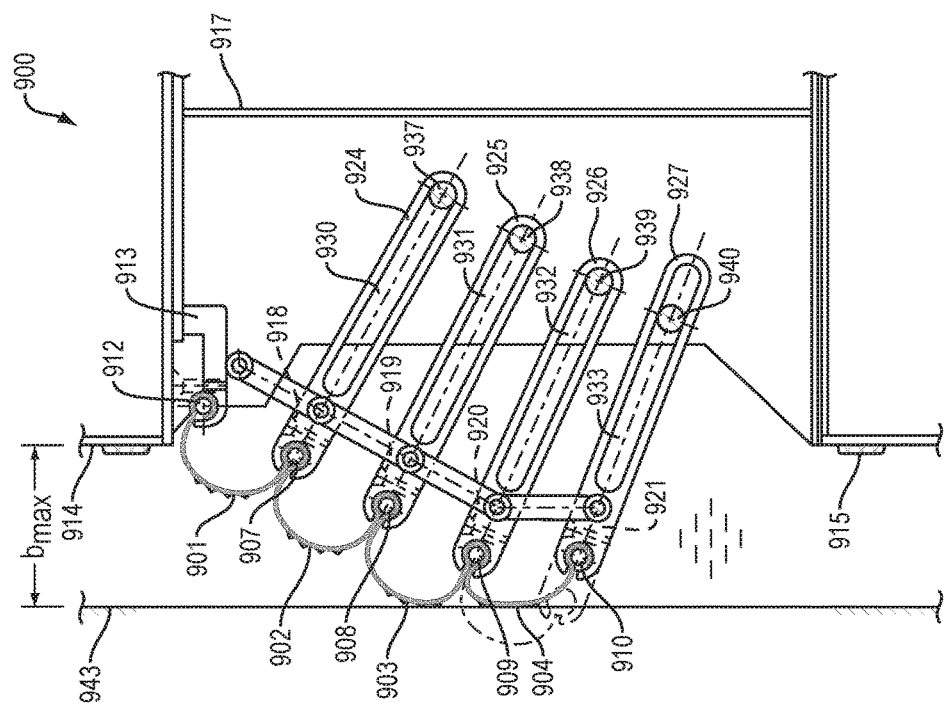
FIG. 9b shows the seal arrangement as per FIG. 9a, in the case of a minimum gap width.

FIG. 9a is a cross-sectional illustration of a fifth seal arrangement, based on a seal 900 in the form of a bellows. The bellows is formed from multiple sealing sections 901, 902, 903, 904 of equal length, which sealing sections are connected to one another at connecting points 907, 908, 909.

As can be seen particularly clearly in the illustration of the bellows as per FIG. 11, it is possible, as connecting points for the sealing sections 1101, 1102, 1103, for use to be made of bead cables 1105, 1106, 1107 around which the steel cables, or sections of steel cables, which form the carrier structure of the sealing sections 1101, 1102, 1103 are looped. The use of the bead cables 1105, 1106, 1107, 1108 as connecting points has the advantage in particular that, in this way, a mechanical connection to the connecting points can be produced particularly easily.

FIG. 11 depicts, by way of example, one of the options for producing said connection, specifically a clamp 1109 which engages around a connecting point. There are however also other possibilities for producing a connection of said type, for example by way of lugs threaded onto the bead cable 1107.

Referring again to FIG. 9a, it is the case in the seal arrangement illustrated therein that the seal 900 is, by way of its upper end 912, fastened in an anchoring 913 in a seal box 917 composed of steel, which seal box is recessed into the inner wall 914 of the hydraulic cylinder 915 and if appropriate clamped there.

In each case one mechanical connecting element 918, 919, 920, 921, in this case in the form of a clamp, engages on the connecting points 907, 908, 909, 910 and on the lower end of the bellows, which mechanical connecting element is connected in each case to a thrust rod 924, 925, 926, 927 with elongated hole 930, 931, 932, 933. Guidance and delimiting rods 937, 938, 939, 940 which are anchored in the side walls 936 of the seal box 917 are guided in the elongated hole 930, 931, 932, 933, which guidance and delimiting rods lie, in an equidistant arrangement, on a line which runs obliquely from top to bottom toward the outer wall 943 of the piston. Accordingly, the lowermost sealing section can be pushed to the furthest extent into the gap.

On the seal box 917, there is provided an inlet 944 for hydraulic fluid. Accordingly, hydraulic fluid enters the seal box and displaces the individual sealing sections 901, 902, 903, 904 toward the outer wall 943 of the piston to such an extent that either that end of the elongated hole 930, 931, 932, 933 which is furthest remote from the outer wall 943 abuts against the associated guide rod 937, 938, 939, 940, or to such an extent that the sealing section abuts against the outer wall 943 of the piston. All sealing sections situated further downward, which could basically be displaced further in the direction of the outer wall 943 of the piston because their guide rods are arranged closer to said outer wall, will then likewise come into contact with the outer wall 943 of the piston. This effect is also illustrated once again by FIG. 9b, which shows the action of the seal 900 of FIG. 9a in the case of different gap widths.

FIG. 10a shows a variant of the seal arrangement from FIG. 9a with an alternative mechanical positioning device. The seal 1000 is also made up of sealing sections 1001, 1002, 1003, 1004 which are connected to one another at connecting points 1007, 1008, 1009, which are each engaged on by mechanical connecting elements 1018, 1019, 1020, 1021.

The difference between the seal arrangements as per FIG. 10a and FIG. 9a consists in the mechanism which guides the individual sealing sections in order to produce the contact with the outer wall 1043 of the piston. In the variant as per FIG. 10a, the mechanical connecting elements 1018, 1019, 1020, 1021 are each connected to their neighbors by spacers 1024, 1025, 1026 which are in each case of equal length and which, in the section plane of the illustration of FIG. 10a, are connected rotatably to one another and to the connecting elements 1018, 1019, 1020, 1021. At those ends of the connecting elements 1018, 1019, 1020, 1021 which face toward the seal box 1017, said connecting elements are, in the section plane of the illustration of FIG. 10a, connected rotatably to a two-arm scissor mechanism system 1030a,b, 1031a,b, 1032a,b, 1033a,b which is likewise rotatable in said plane and which, in said plane, is arranged rotatably on the seal box 1017, wherein the lengths of the short levers 1030a, 1031a, 1032a, 1033a and long levers 1030b, 1031b, 1032b, 1033b, which form the respective components of the scissor system, become longer in each case by a defined length from top to bottom.

If no hydraulic fluid is present in the seal box 1017, said arrangement has the effect that the seal 1000 hangs downward and the lever systems are folded together in V-shaped fashion, as can also be seen in FIG. 10b. In the operating state of the positional energy store, this is however not the case; instead, the pressure of the hydraulic fluid d present in the seal box 1017 forces the sealing sections 1001, 1002, 1003, 1004, 1005 toward the outer wall 1043 of the piston as far as the scissor system permits. For illustration of the mode of operation of said mechanism, FIGS. 10a and 10b also illustrate the adaptation thereof to different gap widths.

The seal arrangements discussed below on the basis of FIGS. 12 to 15 have the common design principle that the sealing section is mounted by way of at least one edge, preferably its upper edge, on a rigid seal carrier which is mounted in rotatable or displaceable fashion in the piston or, preferably, in the inner wall of the hydraulic cylinder, which seal carrier can, by way of the rotation or the displacement, be moved into the gap between the inner wall of the hydraulic cylinder and the piston, such that the seal carrier which is moved into the gap, or an attachment part which is fastened to said seal carrier and which may possibly be designed as a further sealing section, blocks the throughflow of hydraulic fluid through that part of the gap which is covered by the seal carrier or by the attachment part fastened thereto, wherein the sealing section seals off that part of the gap which remains between the seal carrier and the inner wall of the hydraulic cylinder, if the seal carrier is mounted in the piston, or between the seal carrier and the piston, if the seal carrier is mounted in the inner wall of the hydraulic cylinder.

This category of seal arrangements, hereinafter also referred to as folding canopy seal, considerably simplifies the mechanical construction in relation to the seal arrangements 900, 1000 discussed above, without forgoing the advantage that the sealing section has a small length in relation to pure rolling diaphragm seals or pure canopy seals, such as have been discussed above on the basis of FIGS. 4 and 5, and is easily controllable.

Figure 12B:
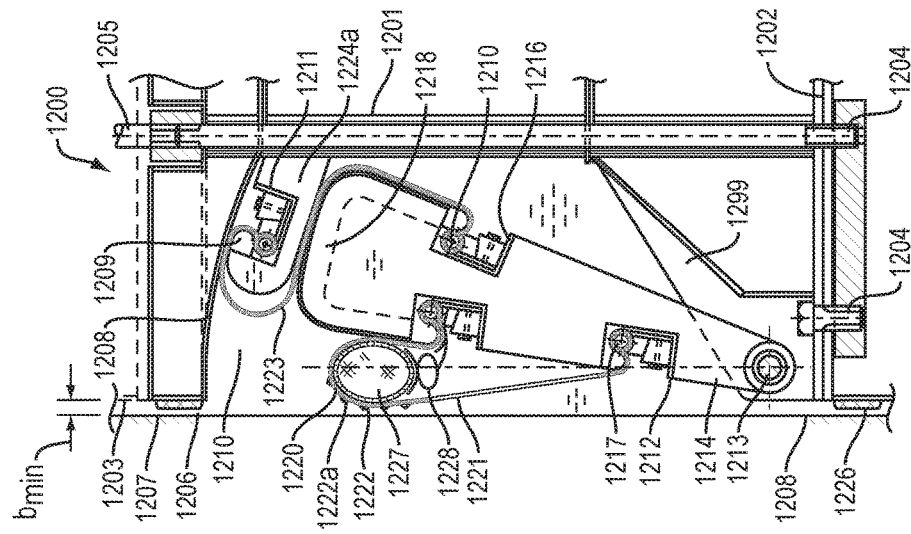
FIG. 12b shows the seal arrangement as per FIG. 12a in the case of a minimum gap width.
Figure 12A:
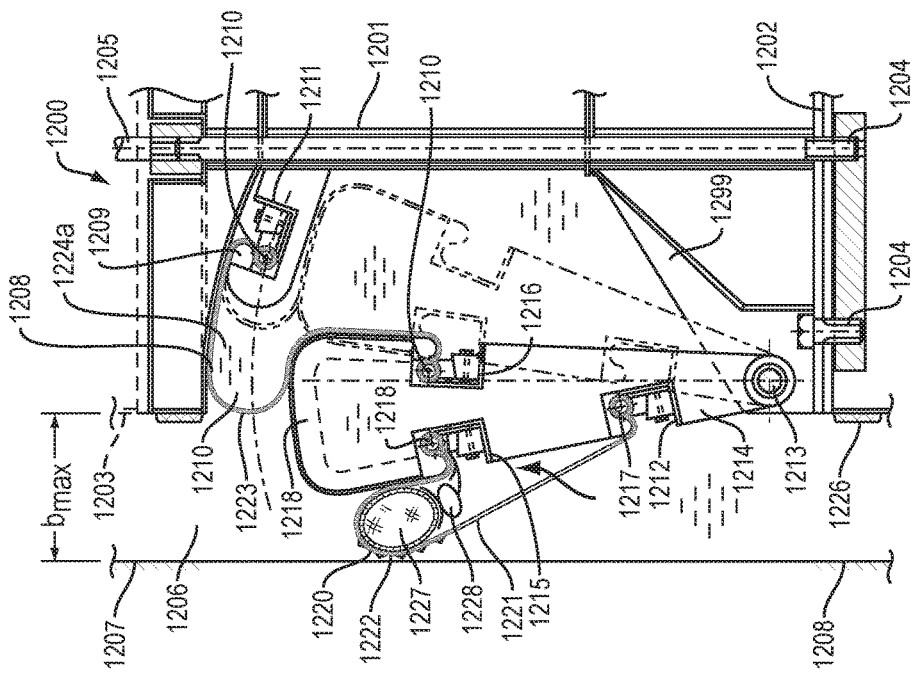
FIG. 12a is a cross-sectional illustration of a sixth seal arrangement based on a foldable canopy, in the case of a maximum gap width.

Specifically, FIG. 12a is a cross-sectional illustration of a seal arrangement 1200 accommodated in a seal box 1201 which is manufactured for example from high-grade steel and which has a base plate 1202 and which, in the embodiment as per FIG. 12a, is accommodated in a recess (said recess is filled by said seal box and is thus no longer visible) on the inner wall 1203 of the hydraulic cylinder and is anchored on said hydraulic cylinder by way of anchorings 1204, 1205. The seal box 1201, which may for example be a steel box which may optionally be stiffened with transverse bulkheads (not visible in FIG. 12a) and a concrete filling, has an anchor box 1209 which projects into a substantially circular sector-shaped recess 1210 in the seal box 1201 (which is also arranged in a possibly provided transverse bulkhead), the boundary surface of which recess in the direction of the seal box 1201 is formed by a high-grade steel layer 1211. In other words, at the upper corner, facing away from the gap, of the circular sector-shaped recess 1210 in the seal box 1201, the anchor box 1209 is anchored in the seal box 1201.

In the downwardly pointing tip of the circular sector-shaped recess 1210, there is provided a rotary axle 1213 which is anchored in the seal box 1201 and on which a seal carrier 1214, which likewise has a substantially circular sector-shaped form but which preferably has a radius smaller than the radius of the circular sector-shaped recess 1210 and has a smaller opening angle α, is arranged so as to be rotatable at least in an angle range about the rotary axle 1213, wherein it should however preferably be ensured that, in all positions of the seal carrier 1214, a fluid duct 1299 is present between the seal carrier 1214 and the high-grade steel layer 1211, the function of which fluid duct will be discussed in more detail further below.

At the upper end of the seal carrier 1214, both on the inner side, that is to say in the direction of the gap 1206, and on the outer side, that is to say in the direction away from the gap 1206, there is arranged in each case one anchor box 1215, 1216. On the lower end of the seal carrier 1214 but above the rotary axle 1213, a further anchor box 1212 is arranged on the inner side of said seal carrier.

In the two anchor boxes 1209, 1215 arranged on the inner side of the seal box 1201, there are the ends 1217, 1218 of a canopy seal 1219 which—aside from the bearing points—corresponds in terms of its construction to the canopy seal discussed above on the basis of FIG. 5a. In this case, too, the canopy seal 1219 is a double-layer sealing sleeve whose non-mounted middle part, which is arranged in the gap 1206, has, as viewed in cross section, the form of a loop 1220 which has a section 1221, which is permeable to hydraulic fluid, and a sealing section 1222, and in the case of which the section 1221 which is permeable to hydraulic fluid, a lower side, facing toward the hydraulic fluid, of the loop 1220 or of the double-layer sealing sleeve, such that the lower side of the loop 1220 is, at least in sections, permeable for the passage of hydraulic fluid. The sealing section 1222 forms the upper layer and the curved section of the loop 1220, in which the upper layer of the loop 1220 transitions into the lower layer of the loop 1220.

The ends or edges of a further sealing section 1223 constructed according to the system described herein, in particular constructed for example as discussed above on the basis of FIGS. 3a to 3d, are anchored in each case in the two remaining anchor boxes 1212, 1216 which are remote from the gap 1206. Said sealing section 1223 thus forms a rolling diaphragm which, by contrast to the rolling diaphragm discussed above on the basis of FIGS. 4a to 4d, however, permits not a displacement of the piston but the rotational movement of the seal carrier 1214. The sealing section 1223 is necessary to seal off the duct 1224 which is present owing to the different radii of seal carrier 1214 and circular sector-shaped recess 1210, but simultaneously also serves for ensuring the reaction of the seal arrangement 1200 to an enlargement of the width of the gap 1206. Specifically, through the fluid duct 1299, hydraulic fluid will enter the space 1224a which presses the seal carrier 1214 and thus also the canopy seal 1219 arranged thereon in the direction of the outer wall 1207 of the piston.

In the case of the seal arrangement 1200, the gap 1206 is sealed off by two components, specifically firstly by the canopy seal 1219 and secondly by the seal carrier 1214, if the latter is of fully radially encircling design, or by attachment parts arranged on said seal carrier, which attachment parts are in particular designed as seal plates (not illustrated) which are arranged on the curved side of the seal carrier 1214 and which are of radially encircling design.

Finally, reference will now be made to the buffer 1226 provided on the seal box 1201, which buffer defines a minimum spacing between the outer wall 1207 of the piston and the inner wall 1203 of the hydraulic cylinder.

Alternatively, the lower anchor box 1212, situated at the inner side, may be arranged below the rotary axle 1213 of the seal carrier 1214 in the seal box 1201 rather than above the rotary axle 1213 in the seal carrier 1214.

Furthermore, in FIG. 12a, there is provided a pressure hose 1227 which is held in position by a supporting spring 1228 and which is filled with a fluid, in particular water or gel, which substantially predefines the shape of the sealing section 1222 of the canopy seal 1219.

The seal arrangement 1200 furthermore has sealing lips 1222a on its sealing section 1222 of the canopy seal 1222. The provision of such sealing lips 1222a on the sealing section 1222, which may basically be applied to all of the discussed embodiments of the system described herein, yields the advantage that they offer protection of the sealing section 1222 against wear, in particular against abrasion during the movement of the piston in the lifting cylinder, and thus lengthen the service life of the sealing section 1222.

FIG. 12*b* shows the seal arrangement 1200 in the case of a minimal gap width.

Figure 13B:
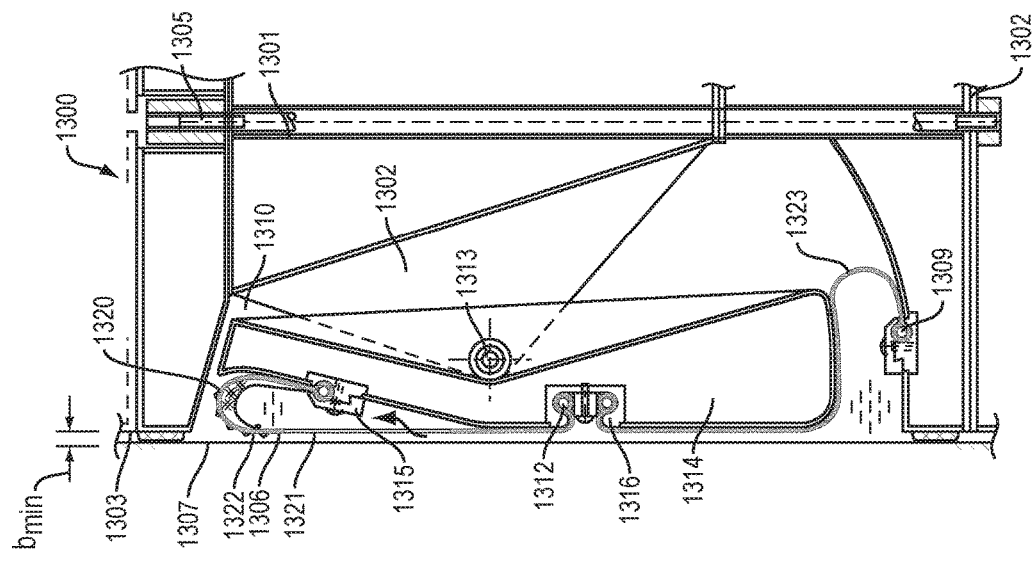
FIG. 13b shows the seal arrangement as per FIG. 16a in the case of a maximum gap width.
Figure 13A:
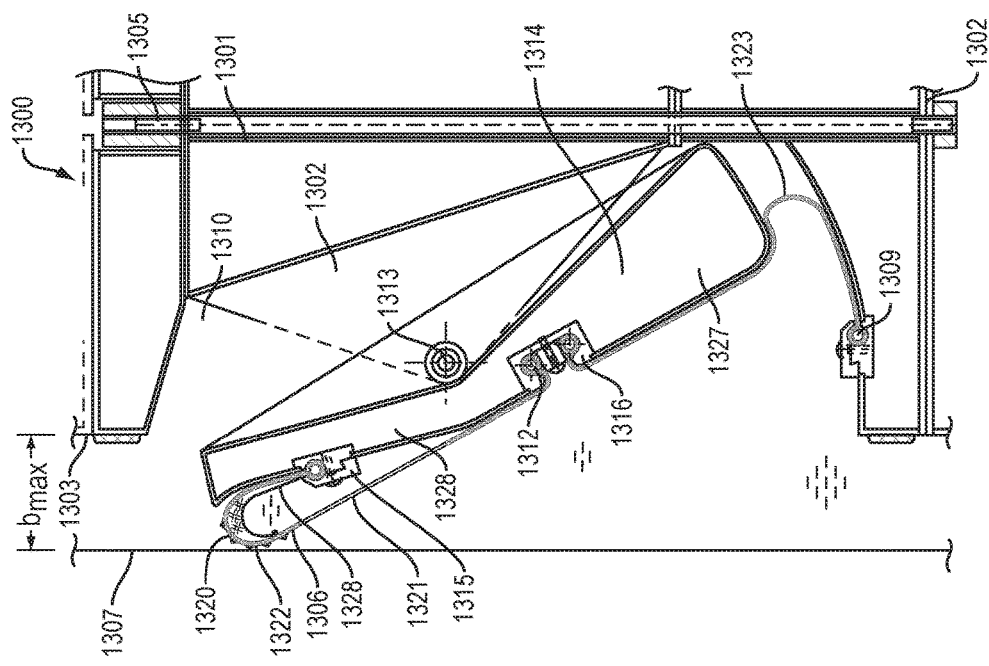
FIG. 13a is a cross-sectional illustration of a seventh seal arrangement.

FIG. 13*a* shows a further variant of a folding canopy seal which differs from the hitherto discussed seal arrangement 1200, which falls within said construction principle, in that the seal carrier 1314 is realized in the form of a two-arm lever which is mounted on the rotary axle 1313 and which has a first arm 1328 and a second arm 1327, that is to say in the form of a rocker arm, and in that the sealing section 1323 is anchored by way of its ends or edges in anchor boxes 1309, 1316 which are arranged below the rotary axle 1313 on the second arm 1327 or in the seal box 1301.

In the case of this arrangement, the pressure of the hydraulic fluid acting on the rolling diaphragm formed by the sealing section 1323 acts on the end of the second arm 1327 in a direction away from the piston, such that the first arm 1328 of the seal carrier 1314 is pressed against the outer wall 1307 of the piston. Depending on the selection of the length of the second arm 1327, it is thus possible for the contact pressure to be varied; however, considerable bending moments are to be expected. The other reference designations are the same as the reference designations of FIG. 12, increased by one hundred.

FIG. 13*b* shows the seal arrangement 1300 in the position which it assumes in the case of a different gap width.

Figure 14A:
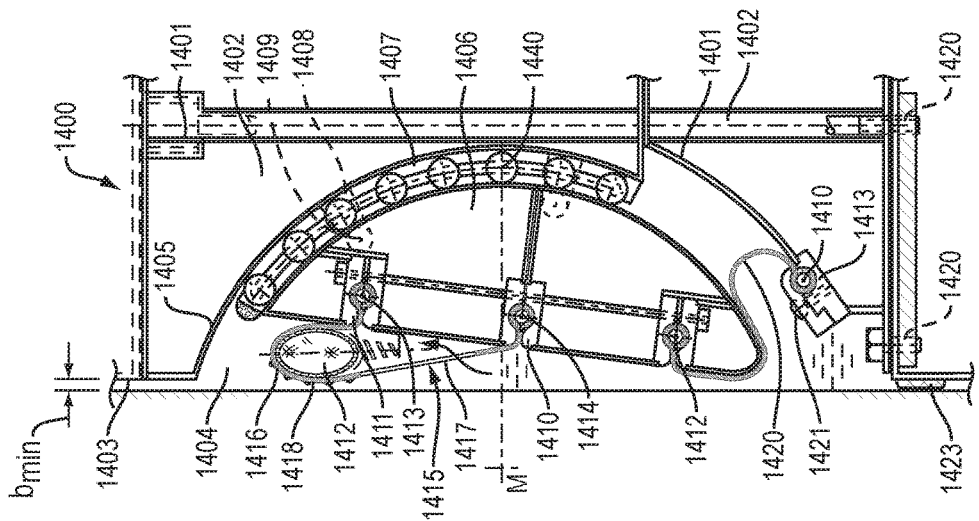
FIG. 14a is a cross-sectional illustration of an eighth seal arrangement.

FIG. 14*a* shows a ninth seal arrangement 1400, with which the problem of high bending moments can be managed. The seal box 1401 with high-grade steel frame 1402 has, in this case, on the side facing toward the gap 1403, a circular segment-shaped recess 1404 with a boundary surface 1405 formed by a high-grade steel layer, wherein the central point M of the circle which defines said circular segment is preferably arranged in the gap 1403 when the piston is arranged concentrically with respect to the hydraulic cylinder. In the lower section of the recess 1404 there is arranged an anchor box 1413 which may be designed for example as per one of the variants of FIG. 3.

The seal carrier 1406 is likewise of circular segment-shaped form, wherein the shape thereof has a circle with the same central point M but with a radius smaller than the radius of the circular segment of the circular segment-shaped recess 1404, such that a duct 1407 is situated between seal carrier 1406 and boundary surface 1405. In the duct 1407 there are arranged pressure rollers 1440 on which the seal carrier 1406 is rotatably mounted by way of holding clamps 1408 with thrust rollers 1409. Other types of bearing arrangement, for example plain bearings, for the seal carrier 1406 are however also possible.

In the seal carrier 1406, on the side facing toward the gap 1403, a first anchor box 1401 is mounted on the axis of symmetry of the circular segment which defines the shape of the seal carrier 1406, a second anchor box 1411 is mounted above the axis of symmetry, and a third anchor box 1412 is mounted below the axis of symmetry. The anchor boxes 1410 to 1412 may also correspond, for example, to one of the variants of FIG. 3.

In the two upper anchor boxes 1410, 1411 arranged on the inner side of the seal carrier 1406, there are the ends 1413, 1414 of a canopy seal 1415 which—aside from the bearing points—corresponds in terms of its construction to the canopy seal discussed above on the basis of FIG. 6*a*. In this case, too, the canopy seal 1415 is a double-layer sealing sleeve whose non-mounted middle part, which is arranged in the gap 1403, has, as viewed in cross section, the form of a loop 1416 which has a section 1417, which is permeable to hydraulic fluid, and a sealing section 1418, and in the case of which the section 1417 which is permeable to hydraulic fluid forms a lower side, facing toward the hydraulic fluid, of the loop 1416 or of the double-layer sealing sleeve, such that the lower side of the loop 1416 is, at least in sections, permeable for the passage of hydraulic fluid. The sealing section 1418 forms the upper layer and the curved section of the loop 1416 in which the upper layer of the loop 1416 transitions into the lower layer of the loop 1416.

In the two remaining anchor boxes 1412, 1413, there are anchored, in each case, the ends or edges of a further sealing section 1420 which is constructed in accordance with the system described herein, in particular is constructed for example as discussed above on the basis of FIGS. 2*a* to 2*d*. Said sealing section 1420 thus forms a rolling diaphragm which, however, by contrast to the rolling diaphragm discussed above on the basis of FIGS. 4*a* to 4*d*, permits not a displacement of the piston but the rotational movement of the seal carrier 1406. The sealing section 1420 is necessary in order to seal off the duct 1407 which is present owing to the different radii of the circular segment-shaped seal carrier 1406 and of the circular sector-shaped recess 1404, but simultaneously also serves for ensuring the reaction of the seal arrangement 1400 to an enlargement of the width of the gap 1403. Specifically, hydraulic fluid will enter the space 1421 from the gap 1403, which hydraulic fluid rotates the seal carrier 1406 and thus turns the canopy seal 1415 arranged thereon in the direction of the outer wall of the piston.

In the case of the seal arrangement 1400, the gap 1403 is sealed off by two components, specifically firstly by the canopy seal 1421 and secondly by the seal carrier 1406 or by attachment parts arranged thereon, for example a segmented seal 1422.

Finally, reference is also made to the buffers 1423, 1424 which are provided on the seal box 1401 and which define a minimum spacing between the outer wall of the piston and the inner wall of the hydraulic cylinder.

Figure 14B:
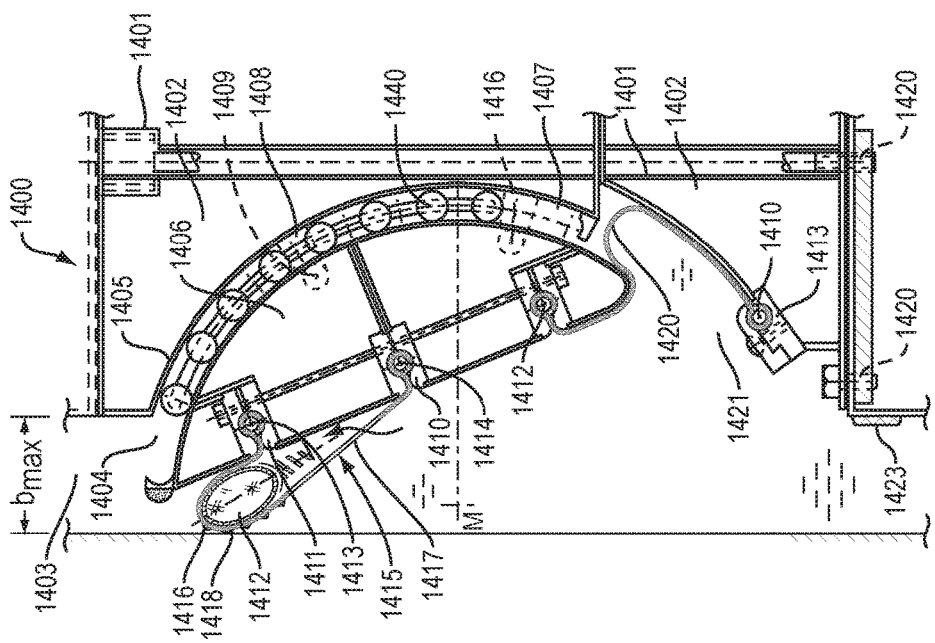
FIG. 14b shows the seal arrangement as per FIG. 17a in the case of a maximum gap width.

FIG. 14*b* shows the seal arrangement 1400 from FIG. 14*a* in the case of a different gap width.

In a variant of the seal arrangement 1400 from FIG. 14*a* which is not illustrated, the canopy seal 1415 which is present in FIG. 14*a* and the rolling diaphragm in the form of the sealing section 1420 are combined to form a combined seal, wherein the fluid-impermeable section of the combined seal, which corresponds to the sealing section 1420, extends beyond the anchor box 1410. In this way, the anchor box 1412 from FIG. 14*a* is made superfluous and can likewise be omitted, in the same way as the segmented seal 1422.

Figure 15B:
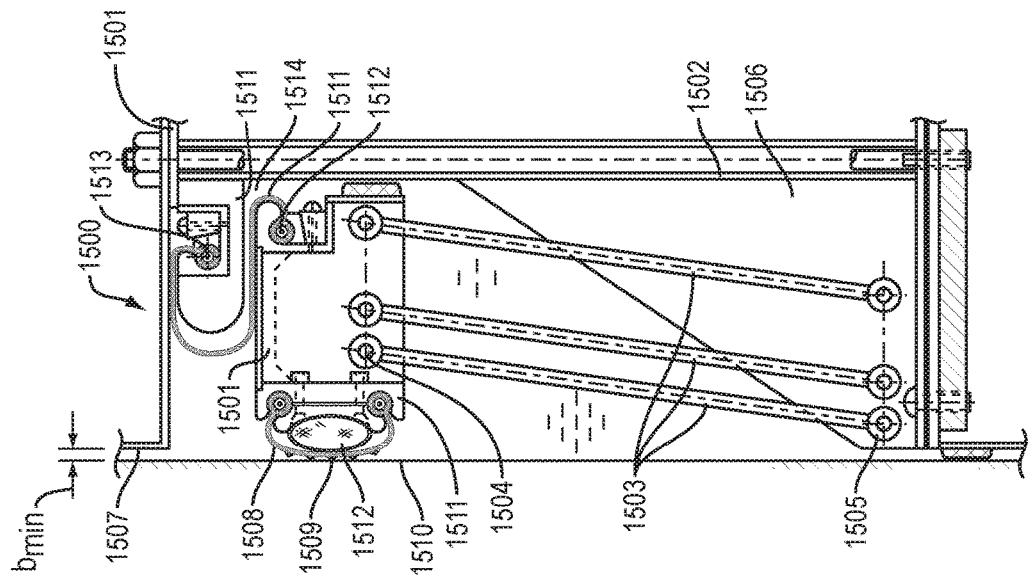
FIG. 15b shows the seal arrangement as per FIG. 18a in the case of a maximum gap width.
Figure 15A:
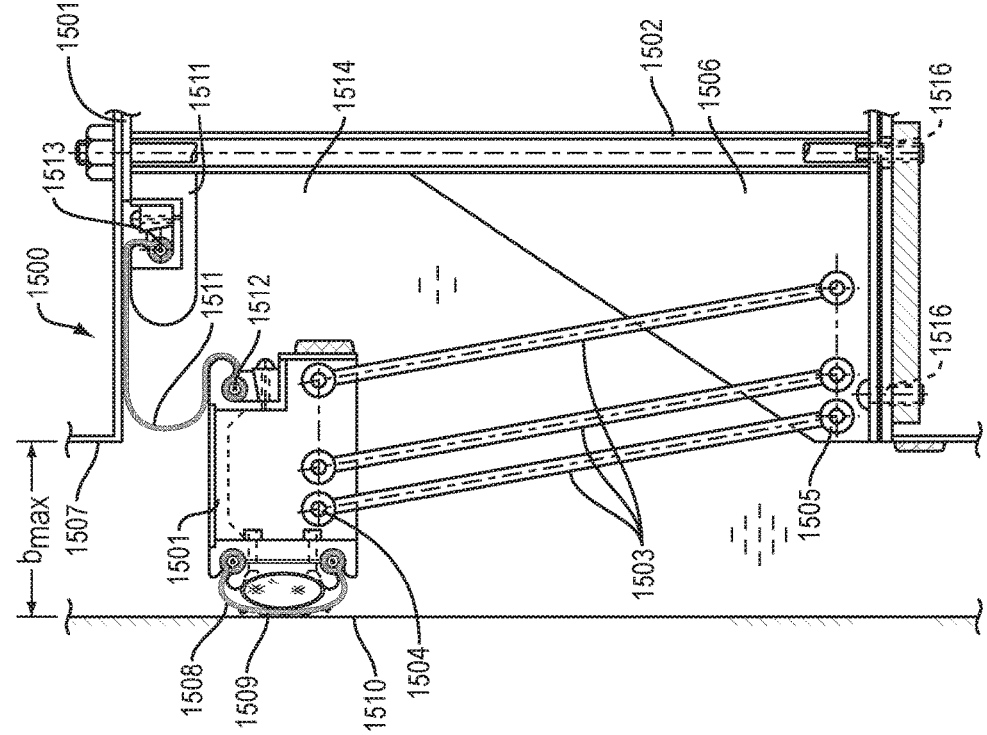
FIG. 15a is a cross-sectional illustration of a ninth seal arrangement.

FIG. 15*a* is a cross-sectional illustration of a further seal arrangement 1500, which varies the basic principle of the seal arrangements 1200, 1300, 1400 in that it has a seal carrier 1501 which adapts to a change in the gap width not by way of a rotational or folding movement but by way of a translational movement, specifically in the form of a parallel displacement. For this purpose, the seal carrier 1501 is arranged in a seal box 1502, to which said seal carrier is connected by way of tension rods 1503. The tension rods 1503 are mounted by way of one end thereof in bearings 1504 provided in the seal carrier 1501, and are mounted by way of the other end thereof in bearings 1505 which are mounted in a bearing block 1506 arranged on the base of the seal box 1502, in such a way that said tension rods are mounted so as to be rotatable about axes perpendicular to the section plane, such that a parallel displacement of the seal carrier 1501 is possible in reaction to a change of the width of the gap 1507, such that a seal 1508 which is mounted on the face side of the seal carrier 1501 is pressed by way of sealing lips 1509 against the outer wall 1510 of the piston.

Said movement is driven by the sealing section 1511 which is in the form of a rolling diaphragm, one end of which sealing section is mounted in an anchor box 1512 arranged on the upper side of the seal carrier 1501, and the other end of which sealing section is mounted in an anchor box 1513 arranged on a top of the recess of the seal box 1502, which anchor box 1513 is acted on from the outside by pressure of the hydraulic fluid that is conducted through the duct 1514.

FIG. 15b shows the seal arrangement 1500 as per FIG. 15a in the case of a different gap width.

In particular in the case of seal arrangements which are arranged in seal boxes, it is possible to realize a radially encircling seal by way of a polygonal arrangement of linear individual segments.

A problem is self-evidently that of the sealing of the individual segments which are arranged at a small angle relative to one another as a result of the polygonal arrangement. With regard to the sealing sections, the problem can be easily realized by way of corresponding adhesive bonding of joints of sealing sections constructed according to the system described herein. For the sealing-off of the interstices between the frames of adjacent seal boxes, elastic sealing blocks with sealing lips are arranged at said interstices.

Figure 16A:
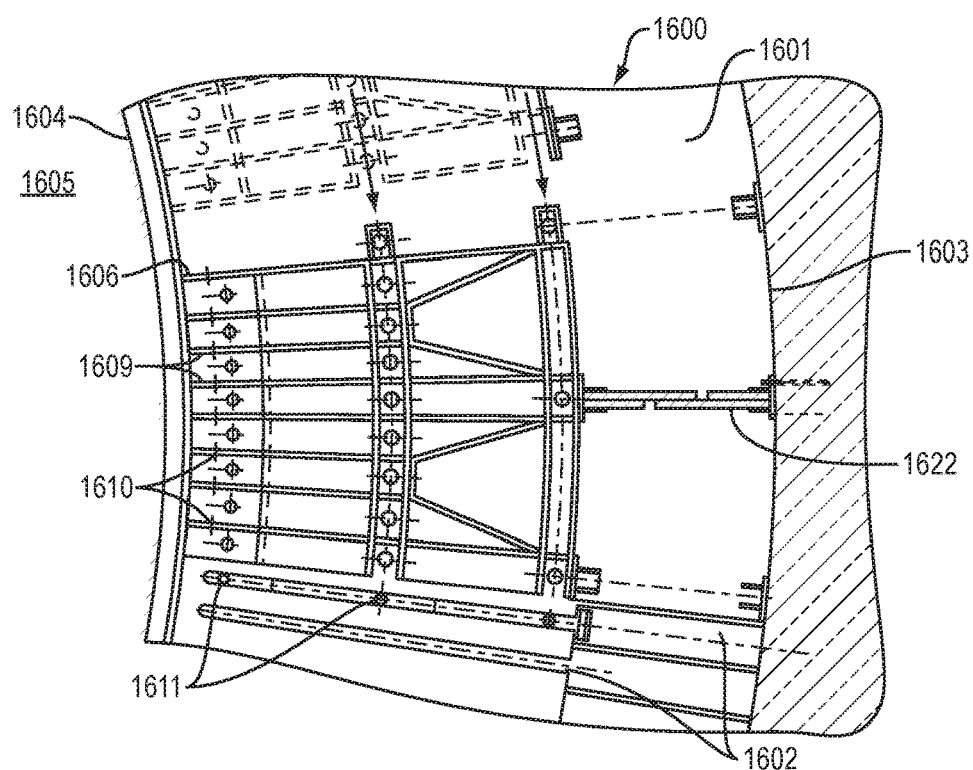
FIG. 16a shows an outline of a concrete outer ring with anchor rails and sealing box lower part.

Further details regarding the construction, structure and connection of such segments will now be discussed on the basis of FIGS. 16a to d and 17a to d:

FIG. 16a shows an outline of a concrete outer ring with anchor rails and sealing box lower part 1606 for a segment of a ring-shaped seal installation 1600. The figure shows a seal chamber 1601 in the concrete outer ring with vertical assembly wall 1603, an anchor rail system 1602 arranged in the base of the seal chamber 1601, the piston 1605 with its outer wall 1604, transverse ribs 1609, threaded anchor 1611 with anchor bolted connection 1612, and pressure strut arrangement 1622.

Figure 16B:
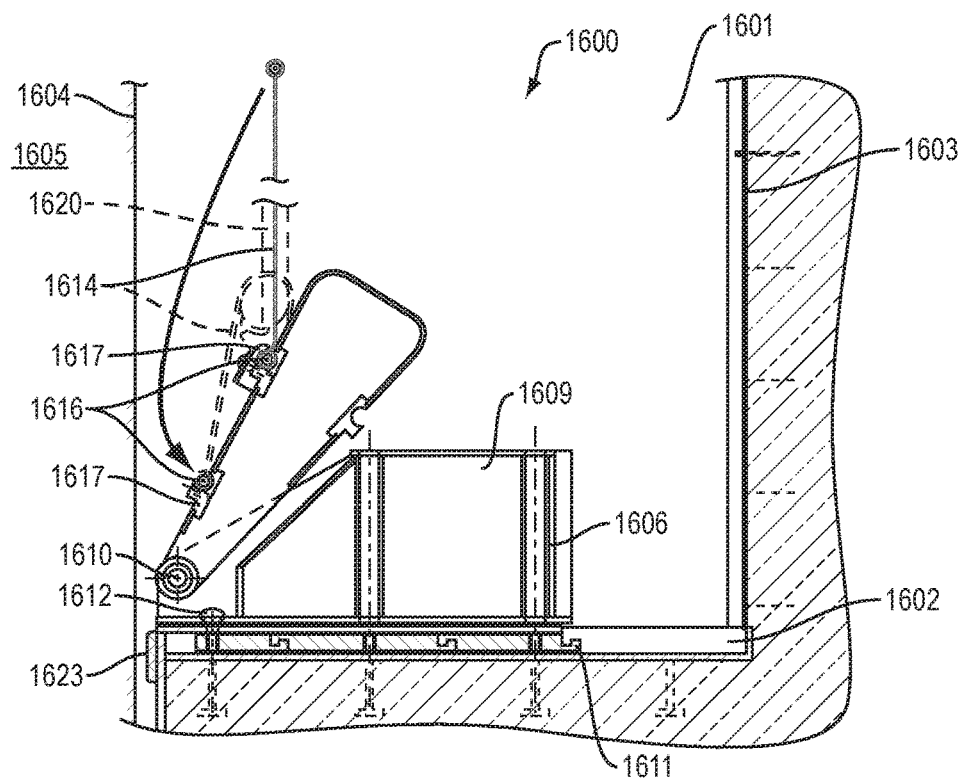
FIG. 16b shows a vertical section through a first assembly section for a seal arrangement as per FIG. 12a, with installed sealing box lower part and fitted seal carrier, during the sealing canopy fitting process.

FIG. 16b shows a vertical section through a first assembly section for a seal arrangement as per FIG. 12a with installed sealing box lower part 1606 together with piston buffer 1623, and seal carrier 1613, mounted so as to be rotatable about the rotary axle 1610, with anchor boxes 1617 and partially installed sealing canopy 1614 with joint adhesive bond 1620.

Figure 16C:
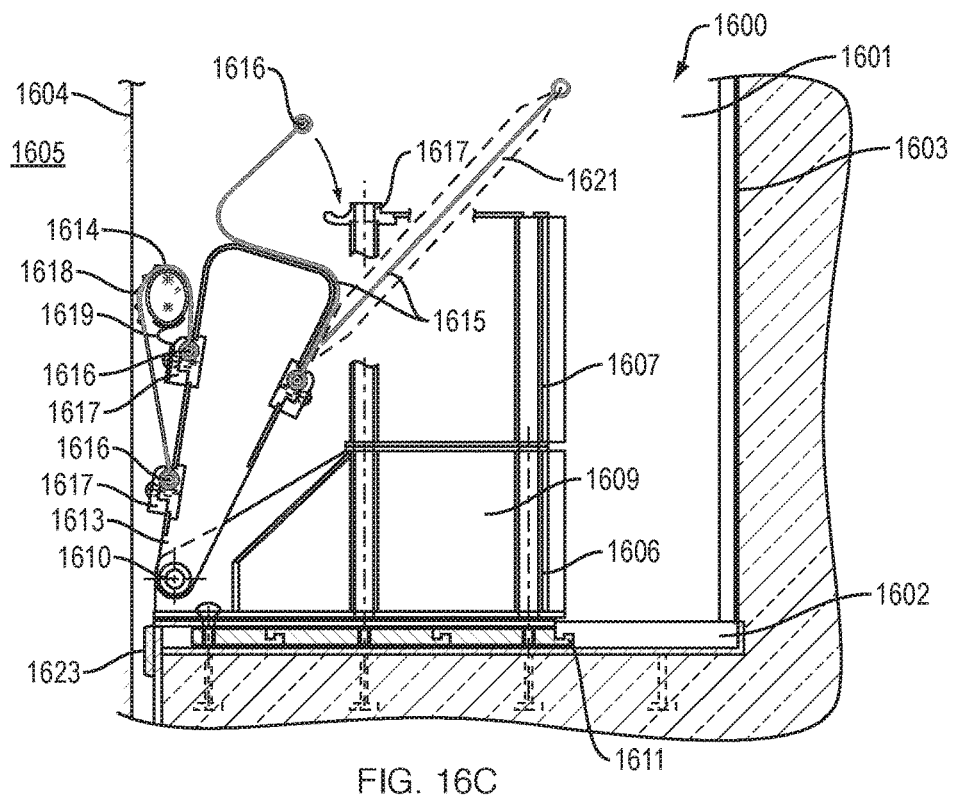
FIG. 16c shows a vertical section through a second assembly section for a seal arrangement as per FIG. 12b after the installation of a seal box middle part and during the rolling diaphragm fitting process.

Further steps of the sealing canopy assembly then yield the vertical section, illustrated in FIG. 16c, of a second assembly section for a seal arrangement as per FIG. 12a after the completion of the installation of the sealing canopy 1614, the end beads 1616 of which are now received in the anchor boxes 1617 facing toward the piston 1605 and which is now looped around the elastic pressure hose 1618 which is carried by the pressure hose carrier 1619. Furthermore, the seal box middle part 1606 has been installed and the installation of the rolling diaphragm 1615 has commenced.

Figure 16D:
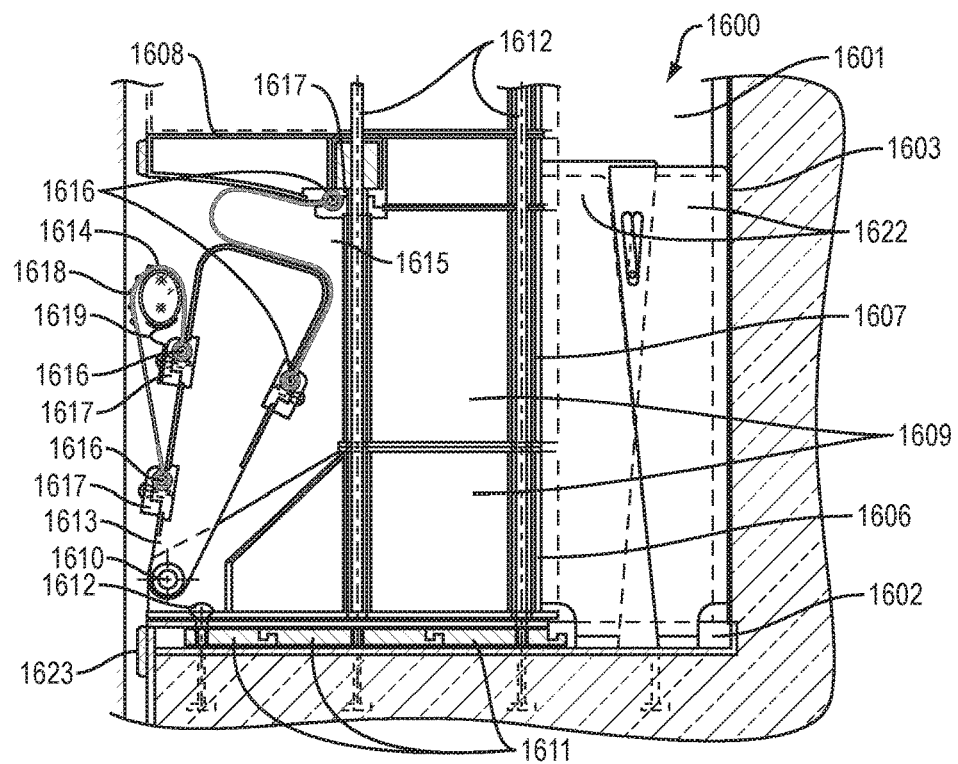
FIG. 16d shows a vertical section in the case of a complete seal box, flap, canopy seal, rolling diaphragm, clamping bolt system and fitting of the pressure anchoring against the concrete ring.

After the fastening of the end beads 1616 of the rolling diaphragm 1615 in the still-free anchor boxes 1617 and installation of the seal box upper part 1608 and of a pressure strut arrangement 1622 against the concrete ring wall, the situation shown in vertical section in FIG. 16d is then realized.

FIG. 17a shows the construction of a flap segment 1700 for a seal arrangement as per FIG. 12a, but without sealing sections, in a view of the flap from the piston side, wherein the flap segment 1700 is presently being inserted, as can be seen from the fact that the rotary joints 1706 of the flap carriers 1704 are not yet anchored by way of the bearings or anchor boxes 1705 arranged thereon in the rotary joint receptacles 1711, and from the fact that the flap joint 1703 is not yet in flush engagement with the flap joint, illustrated by dashed lines, of the adjacent flap segment. The way in which said anchoring can be performed and secured by way of a securing means 1707 is illustrated schematically in FIG. 17c.

As can be seen in particular from FIG. 17b, which shows a section through a seal carrier 1704, arranged on the gusset plate 1701 of the seal box, of the flap segment 1700 from FIG. 17a, interstice blocks 1708, which may for example be composed of hard rubber, are provided between the individual seal carriers 1704. This measure in particular makes it possible for the forces which act in the direction perpendicular to the large surfaces of the seal carrier in the event of variations of the gap width in the case of a segmented construction to be accommodated, and for the necessary elastic deformations to be permitted.

As shown in particular in FIG. 17d, the sealing for prevention of an escape of fluid may be further improved by way of sealing fabric 1709 provided on the interstice block.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

The invention claimed is:

1. A positional energy store, comprising:
   a hydraulic cylinder;
   a piston arranged in the hydraulic cylinder for the storage of energy in the form of potential energy, wherein a position of the piston relative to the earth's surface is variable;
   a pump that pumps hydraulic fluid via lines into the hydraulic cylinder to raise the piston,
   a generator that converts flow energy of the hydraulic fluid displaced from the hydraulic cylinder during the lowering of the piston into electricity; and
   a seal arrangement having components disposed between the hydraulic cylinder and the piston and having at least one sealing section with a flexible carrier structure for accommodating acting forces, the carrier structure being at least one of: impregnated with a solidified fluid-impermeable material or coated on at least one side with a fluid-impermeable layer that seals against a passage of fluid,
   wherein the flexible carrier structure includes one of: mutually adjacently arranged steel cables or mutually adjacently arranged sections of one or more steel cables that are connected to one another by way of a fabric and wherein the fluid-impermeable layer or the solidified fluid-impermeable material is composed of rubber, silicon or an elastic plastic.

2. The positional energy store as claimed in claim 1, wherein the sealing section is elastic in a circumferential direction of the piston.

3. The positional energy store as claimed in claim 1, further comprising:
   a radially encircling seal disposed between the hydraulic cylinder and the piston, the seal being anchored on one end by a first bearing which is recessed into an inner wall of the hydraulic cylinder and anchored on an other end by a second bearing which is recessed into an outer wall of the piston.

4. The positional energy store as claimed in claim 3, wherein spacing of the first bearing and of the second bearing when the positional energy store is fully discharged corresponds to half of a maximum lifting height and wherein, when the positional energy store is fully discharged, the second bearing is arranged below the first bearing.

5. The positional energy store as claimed in claim 1, further comprising:
   centering means for the centering the piston in the hydraulic cylinder.

6. The positional energy store as claimed in claim 1, further comprising:
   an encircling concrete ring that provides a bearing for the seal arrangement, the encircling concrete ring being provided on at least one of: the hydraulic cylinder or the piston.

7. The positional energy store as claimed in claim 1, wherein at least one of: an inner wall surface of the hydraulic cylinder or an outer wall surface of the piston are lined or coated with a layer which reduces roughness of the wall surface, the layer being provided to a height in at least a region between a point against which a seal of the seal arrangement bears when the positional energy store is fully discharged and a point against which the seal bears when the positional energy store is charged to a maximum amount.

8. The positional energy store as claimed in claim 1, wherein the piston is formed by a pot having a filler material with a density greater than 2000 kg/m$^3$.

9. The positional energy store as claimed in claim 1, further comprising:
   a ring-shaped arrangement of multiple ballast tanks disposed on a top side of the piston that are arranged concentrically with respect to a central axis of the piston, wherein fill levels of the ballast tanks are regulated independently each other.

10. A positional energy store, comprising:
    a hydraulic cylinder;
    a piston arranged in the hydraulic cylinder for the storage of energy in the form of potential energy, wherein a position of the piston relative to the earth's surface is variable;
    a pump that pumps hydraulic fluid via lines into the hydraulic cylinder to raise the piston,
    a generator that converts flow energy of the hydraulic fluid displaced from the hydraulic cylinder during the lowering of the piston into electricity; and
    a seal arrangement having components disposed between the hydraulic cylinder and the piston and having at least one sealing section with a flexible carrier structure for accommodating acting forces, the carrier structure being at least one of: impregnated with a solidified fluid-impermeable material or coated on at least one side with a fluid-impermeable layer that seals against a passage of fluid,
    wherein the seal arrangement includes a seal that surrounds the piston radially and is arranged in a gap between the piston and the hydraulic cylinder to form a loop, wherein both ends of the seal are anchored in one of: two separate bearings recessed in an inner wall of the hydraulic cylinder or two separate bearings recessed in an outer wall of the piston, the loop forming a double-layer sealing sleeve, wherein the loop points upward and has a length which is greater than two times a maximum spacing between the outer wall of the piston and the inner wall of the hydraulic cylinder and wherein a lower layer of the loop which faces toward the hydraulic fluid is at least partially permeable for passage of the hydraulic fluid, and wherein an upper layer of the loop and a curved region of the loop in which the upper layer transitions into the lower layer form the at least one sealing section.

11. The positional energy store as claimed in claim 10, wherein the inner wall of the hydraulic cylinder, if the seal is arranged on the hydraulic cylinder, or in the outer wall of the piston, if the seal is arranged on the piston, includes a recess in which the seal can be received if a width of a gap between the hydraulic cylinder and the piston decreases.

12. A positional energy store, comprising:
    a hydraulic cylinder;
    a piston arranged in the hydraulic cylinder for the storage of energy in the form of potential energy, wherein a position of the piston relative to the earth's surface is variable;
    a pump that pumps hydraulic fluid via lines into the hydraulic cylinder to raise the piston,
    a generator that converts flow energy of the hydraulic fluid displaced from the hydraulic cylinder during the lowering of the piston into electricity; and
    a seal arrangement having components disposed between the hydraulic cylinder and the piston and having at least one sealing section with a flexible carrier structure for accommodating acting forces, the carrier structure being at least one of: impregnated with a solidified fluid-impermeable material or coated on at least one side with a fluid-impermeable layer that seals against a passage of fluid,
    wherein the seal arrangement includes a seal that surrounds the piston radially and is arranged in a gap between the piston and the hydraulic cylinder to form a loop, wherein both ends of the seal are anchored in one of: two separate bearings recessed in an inner wall of the hydraulic cylinder or two separate bearings recessed in an outer wall of the piston, the loop forming a double-layer sealing sleeve, wherein the loop points upward and has a length which is greater than two times a maximum spacing between the outer wall of the piston and the inner wall of the hydraulic cylinder and wherein a pipe system for providing the hydraulic fluid is provided in the hydraulic cylinder if the bearings are recessed in the hydraulic cylinder or is provided in the piston if the bearings are recessed in the piston, and wherein an interior space of the loop is subjected to a pressure which includes pressure of the hydraulic fluid in the gap.

13. The positional energy store as claimed in claim 12, further comprising:
    a mechanism that increases the pressure in the interior space of the loop.

14. A positional energy store, comprising:
    a hydraulic cylinder;
    a piston arranged in the hydraulic cylinder for the storage of energy in the form of potential energy, wherein a position of the piston relative to the earth's surface is variable;
    a pump that pumps hydraulic fluid via lines into the hydraulic cylinder to raise the piston,
    a generator that converts flow energy of the hydraulic fluid displaced from the hydraulic cylinder during the lowering of the piston into electricity; and
    a seal arrangement having components disposed between the hydraulic cylinder and the piston and having at least one sealing section with a flexible carrier structure for accommodating acting forces, the carrier structure being at least one of: impregnated with a solidified fluid-impermeable material or coated on at least one side with a fluid-impermeable layer that seals against a passage of fluid, wherein the seal arrangement includes a seal that is anchored on an upper bearing and on a lower bearing which are both arranged in one of: an inner wall of the hydraulic cylinder or an outer wall of the piston, and wherein a section of the seal covers a pressure hose provided in an encircling recess of the inner wall of the hydraulic cylinder if the bearings are arranged therein or provided in a recess in the piston if the bearings are arranged therein and wherein the section runs radially around the piston and is subjected by a pump to a pressure which exceeds a pressure of the hydraulic fluid prevailing at the seal, such that the pressure hose expands into a gap between the hydraulic cylinder and the piston and the seal is pressed in all directions perpendicular to a lifting direction into contact, at a contact point, with the inner surface of the hydraulic cylinder if the seal is anchored on the piston or with the outer surface of the piston if the seal is anchored on the hydraulic cylinder, and wherein, in a position corresponding to the contact point, the sealing section of the seal extends at least from a lower bearing to the contact point to inhibit escape of the hydraulic fluid.

15. A positional energy store, comprising:

a hydraulic cylinder;

a piston arranged in the hydraulic cylinder for the storage of energy in the form of potential energy, wherein a position of the piston relative to the earth's surface is variable;

a pump that pumps hydraulic fluid via lines into the hydraulic cylinder to raise the piston, a generator that converts flow energy of the hydraulic fluid displaced from the hydraulic cylinder during the lowering of the piston into electricity; and a seal arrangement having components disposed between the hydraulic cylinder and the piston and having at least one sealing section with a flexible carrier structure for accommodating acting forces, the carrier structure being at least one of: impregnated with a solidified fluid-impermeable material or coated on at least one side with a fluid-impermeable layer that seals against a passage of fluid, wherein the seal arrangement includes a seal that is provided as bellows with multiple sealing sections which are connected at connecting points and wherein a mechanical guide is provided at at least some of the connecting points to permit an adaptation of the seal to a width of a gap between the hydraulic cylinder and the piston.

16. A positional energy store, comprising:

a hydraulic cylinder;

a piston arranged in the hydraulic cylinder for the storage of energy in the form of potential energy, wherein a position of the piston relative to the earth's surface is variable;

a pump that pumps hydraulic fluid via lines into the hydraulic cylinder to raise the piston, a generator that converts flow energy of the hydraulic fluid displaced from the hydraulic cylinder during the lowering of the piston into electricity; and a seal arrangement having components disposed between the hydraulic cylinder and the piston and having at least one sealing section with a flexible carrier structure for accommodating acting forces, the carrier structure being at least one of: impregnated with a solidified fluid-impermeable material or coated on at least one side with a fluid-impermeable layer that seals against a passage of fluid, wherein the sealing section is mounted by an edge thereon on the carrier which is mounted in rotatable or displaceable fashion in an outer wall of the piston or in an inner wall of the hydraulic cylinder and wherein the carrier is moveable, by way of rotation or displacement, into a gap between the inner wall of the hydraulic cylinder and the piston, such that the carrier or an attachment part fastened to the carrier, blocks throughflow of hydraulic fluid through the gap.

17. The positional energy store as claimed in claim 16, wherein the carrier has a circular segment-shaped form and is mounted rotatably on pressure rollers to guide the carrier on a circular path.

18. The positional energy store as claimed in claim 16, wherein an additional sealing section is formed by a rolling diaphragm arranged between the carrier and a bearing of the carrier, such that pressure of the hydraulic fluid on the additional sealing section causes the sealing section to be pressed upon.

19. A positional energy store, comprising:

a hydraulic cylinder;

a piston arranged in the hydraulic cylinder for the storage of energy in the form of potential energy, wherein a position of the piston relative to the earth's surface is variable;

a pump that pumps hydraulic fluid via lines into the hydraulic cylinder to raise the piston, a generator that converts flow energy of the hydraulic fluid displaced from the hydraulic cylinder during the lowering of the piston into electricity; and a seal arrangement having components disposed between the hydraulic cylinder and the piston and having at least one sealing section with a flexible carrier structure for accommodating acting forces, the carrier structure being at least one of: impregnated with a solidified fluid-impermeable material or coated on at least one side with a fluid-impermeable layer that seals against a passage of fluid, wherein a wall of the hydraulic cylinder is formed from drilled piles composed of concrete and wherein the at least one sealing sections includes at least two sealing sections composed of a material which is impermeable to passage of hydraulic fluid overlap one another on an inner side of the hydraulic cylinder, wherein each of the at least two sealing sections are anchored on a drilled pile.

\* \* \* \* \*